(12) United States Patent
Bhave et al.

(10) Patent No.: US 11,366,844 B2
(45) Date of Patent: Jun. 21, 2022

(54) SYSTEM FOR ORGANIZING AND FAST SEARCHING OF MASSIVE AMOUNTS OF DATA

(71) Applicants: CUMULUS SYSTEMS INC., Campbell, CA (US); Ajit Bhave, Palo Alto, CA (US); Arun Ramachandran, Palo Alto, CA (US); Sai Krishnam Nadimpalli, Bangalore (IN); Sandeep Bele, Pune (IN)

(72) Inventors: Ajit Bhave, Palo Alto, CA (US); Arun Ramachandran, Cupertino, CA (US); Sai Krishnam Raju Nadimpalli, Bangalore (IN); Sandeep Bele, Pune (IN)

(73) Assignee: Cumulus Systemsm Inc., Campbell, CA (US)

( * ) Notice: Subject to any disclaimer, the term of this patent is extended or adjusted under 35 U.S.C. 154(b) by 0 days.

(21) Appl. No.: 16/863,593

(22) Filed: Apr. 30, 2020

(65) Prior Publication Data
US 2020/0257716 A1 Aug. 13, 2020

Related U.S. Application Data

(63) Continuation of application No. 16/501,631, filed on May 13, 2019, now abandoned, which is a (Continued)

(51) Int. Cl.
*G06F 15/167* (2006.01)
*G06F 16/36* (2019.01)
(Continued)

(52) U.S. Cl.
CPC ......... *G06F 16/36* (2019.01); *G05B 23/0272* (2013.01); *G06F 11/3006* (2013.01); (Continued)

(58) Field of Classification Search
CPC .... G06F 16/36; G06F 40/205; G06F 16/3329; G06F 16/338; G06F 16/383; G06F 16/31; (Continued)

(56) References Cited

U.S. PATENT DOCUMENTS

| 5,172,226 A | 12/1992 | Iraelson |
| 5,179,378 A | 1/1993 | Ranganathan |

(Continued)

FOREIGN PATENT DOCUMENTS

| WO | WO9938266 | 7/1999 |
| WO | WO9938286 | 7/1999 |

*Primary Examiner* — Phuoc H Nguyen
(74) *Attorney, Agent, or Firm* — Ron Fish

(57) ABSTRACT

A system to collect and store in a special data structure arranged for rapid searching massive amounts of data. Performance metric data is one example. The performance metric data is recorded in time-series measurements, converted into unicode, and arranged into a special data structure having one directory for every day which stores all the metric data collected that day. The performance metric data is collected by one or more probes running on machines about which data is being collected. The performance metric data is compressed prior to transmission to a server over any data path. The data structure at the server where analysis is done has a subdirectory for every resource type. Each subdirectory contains text files of performance metric data values measured for attributes in a group of attributes to which said text file is dedicated. Each attribute has its own section and the performance metric data values are recorded in time series as unicode hex numbers as a comma delimited list. Analysis of the performance metric data is done using regular expressions. For speed, cache memory is used. Performance metric data outside the start time and end time named by the user on a query screen is eliminated before the regular expression is applied.

7 Claims, 27 Drawing Sheets

Related U.S. Application Data continuation of application No. 13/853,925, filed on Mar. 29, 2013, now Pat. No. 9,396,287, which is a continuation-in-part of application No. 13/200,996, filed on Oct. 5, 2011, now abandoned.

(51) Int. Cl.

| | | |
|---|---|---|
| *G06F 21/55* | (2013.01) | |
| *G06F 16/43* | (2019.01) | |
| *G06F 16/84* | (2019.01) | |
| *G06F 16/14* | (2019.01) | |
| *G06F 16/185* | (2019.01) | |
| *G06F 16/245* | (2019.01) | |
| *G06F 16/25* | (2019.01) | |
| *G06F 16/28* | (2019.01) | |
| *G06F 16/33* | (2019.01) | |
| *G06F 16/335* | (2019.01) | |
| *G06F 16/951* | (2019.01) | |
| *G06F 16/242* | (2019.01) | |
| *G06F 16/2452* | (2019.01) | |
| *G06F 16/2453* | (2019.01) | |
| *G06F 16/2455* | (2019.01) | |
| *G06F 16/2458* | (2019.01) | |
| *G06F 16/901* | (2019.01) | |
| *G06F 16/9032* | (2019.01) | |
| *G06F 16/9535* | (2019.01) | |
| *G06F 16/903* | (2019.01) | |
| *G05B 23/02* | (2006.01) | |
| *G06F 11/34* | (2006.01) | |
| *G06F 11/30* | (2006.01) | |
| *H04L 43/04* | (2022.01) | |
| *H04L 12/46* | (2006.01) | |
| *H04L 43/12* | (2022.01) | |
| *H04L 43/00* | (2022.01) | |
| *H04L 67/025* | (2022.01) | |
| *H04L 67/01* | (2022.01) | |
| *H04L 69/329* | (2022.01) | |
| *G06F 40/205* | (2020.01) | |
| *H04L 9/40* | (2022.01) | |
| *H04L 67/00* | (2022.01) | |
| *H04L 43/022* | (2022.01) | |
| *G06F 16/332* | (2019.01) | |
| *G06F 16/338* | (2019.01) | |
| *G06F 16/383* | (2019.01) | |
| *G06F 16/31* | (2019.01) | |
| *G06F 16/248* | (2019.01) | |
| *G06F 40/126* | (2020.01) | |
| *G06F 40/146* | (2020.01) | |
| *G06F 40/106* | (2020.01) | |

(52) U.S. Cl.
CPC ...... *G06F 11/3072* (2013.01); *G06F 11/3082* (2013.01); *G06F 11/3409* (2013.01); *G06F 11/3476* (2013.01); *G06F 16/148* (2019.01); *G06F 16/185* (2019.01); *G06F 16/245* (2019.01); *G06F 16/2423* (2019.01); *G06F 16/2452* (2019.01); *G06F 16/2453* (2019.01); *G06F 16/2455* (2019.01); *G06F 16/2468* (2019.01); *G06F 16/2477* (2019.01); *G06F 16/24522* (2019.01); *G06F 16/258* (2019.01); *G06F 16/283* (2019.01); *G06F 16/284* (2019.01); *G06F 16/31* (2019.01); *G06F 16/334* (2019.01); *G06F 16/335* (2019.01); *G06F 16/338* (2019.01); *G06F 16/3329* (2019.01); *G06F 16/3331* (2019.01); *G06F 16/3337* (2019.01); *G06F 16/383* (2019.01); *G06F 16/43* (2019.01); *G06F 16/86* (2019.01); *G06F 16/9024* (2019.01); *G06F 16/9032* (2019.01); *G06F 16/90335* (2019.01); *G06F 16/90344* (2019.01); *G06F 16/951* (2019.01); *G06F 16/9535* (2019.01); *G06F 21/552* (2013.01); *G06F 40/205* (2020.01); *H04L 12/4625* (2013.01); *H04L 29/06* (2013.01); *H04L 29/06047* (2013.01); *H04L 29/08072* (2013.01); *H04L 29/08099* (2013.01); *H04L 43/022* (2013.01); *H04L 43/04* (2013.01); *H04L 43/12* (2013.01); *H04L 43/14* (2013.01); *H04L 67/025* (2013.01); *H04L 67/42* (2013.01); *H04L 69/329* (2013.01); *G06F 16/248* (2019.01); *G06F 40/106* (2020.01); *G06F 40/126* (2020.01); *G06F 40/146* (2020.01); *G06F 2216/03* (2013.01)

(58) Field of Classification Search
CPC ........ G06F 16/43; G06F 16/86; G06F 16/148; G06F 16/185; G06F 16/245; G06F 16/258; G06F 16/283; G06F 16/284; G06F 16/334; G06F 16/335; G06F 16/951; G06F 16/2423; G06F 16/2452; G06F 16/2453; G06F 16/2455; G06F 16/2468; G06F 16/2477; G06F 16/3331; G06F 16/3337; G06F 16/9024; G06F 16/9032; G06F 16/9535; G06F 16/24522; G06F 16/90335; G06F 16/90344; G06F 11/3006; G06F 11/3082; G06F 21/552; G06F 11/3476; G06F 11/3072; G06F 11/3409; G06F 40/106; G06F 40/126; G06F 40/146; G06F 16/248; G06F 2216/03; H04L 67/025; H04L 67/42; H04L 69/329; H04L 12/4625; H04L 43/12; H04L 43/14; H04L 43/022; H04L 29/06047; H04L 29/08099; H04L 29/06; H04L 29/08072; H04L 43/04; G05B 23/0272
USPC ...................................................... 709/224
See application file for complete search history.

(56) References Cited

U.S. PATENT DOCUMENTS

| | | |
|---|---|---|
| 5,613,113 A | 3/1997 | Goldring |
| 5,668,928 A | 9/1997 | Groner |
| 6,128,628 A | 10/2000 | Waclawski |
| 6,389,427 B1 | 5/2002 | Faulkner |
| 6,598,078 B1 | 7/2003 | Ehrlich |
| 6,643,653 B1 | 11/2003 | Chu |
| 6,658,487 B1 | 12/2003 | Smith |
| 6,737,994 B2 | 5/2004 | Davis |
| 6,763,347 B1 | 7/2004 | Zhang |
| 7,340,477 B1 | 3/2008 | Tolbert |
| 7,343,604 B2 | 3/2008 | Grabarnik |
| 7,890,548 B2 | 2/2011 | Sengupta |
| 8,112,425 B2 | 2/2012 | Baum |
| 8,126,853 B2 | 2/2012 | Sakamoto |
| 8,214,439 B2 | 7/2012 | Hwang |
| 8,386,633 B2 | 2/2013 | Smith |
| 8,522,192 B1 | 8/2013 | Avalos |
| 8,725,756 B1 * | 5/2014 | Garg ................... G06F 16/248 707/767 |
| 8,892,540 B2 | 11/2014 | Walker |
| 8,965,719 B1 | 2/2015 | Ippolito |
| 2001/0044751 A1 | 11/2001 | Pugliese |
| 2003/0182103 A1 | 3/2003 | Atkin |
| 2003/0212696 A1 | 11/2003 | Davis |
| 2004/0034521 A1 | 4/2004 | Kawakura |

(56) References Cited

U.S. PATENT DOCUMENTS

| | | |
|---|---|---|
| 2004/0215647 A1 | 10/2004 | Earn |
| 2004/0243607 A1 | 12/2004 | Tummalalpalli |
| 2005/0044064 A1 | 2/2005 | Haase |
| 2005/0049997 A1 | 3/2005 | Shipp |
| 2005/0076067 A1 | 4/2005 | Bakalash |
| 2005/0160110 A1 | 7/2005 | Charlet |
| 2005/0228906 A1 | 10/2005 | Kubota |
| 2005/0278703 A1 | 12/2005 | Lo |
| 2006/0184874 A1 | 8/2006 | Kimiya |
| 2006/0200452 A1 | 9/2006 | Lee |
| 2006/0218450 A1 | 9/2006 | Malik |
| 2007/0113031 A1 | 5/2007 | Brown |
| 2007/0143309 A1 | 6/2007 | Malik |
| 2007/0226204 A1 | 9/2007 | Feldman |
| 2007/0226554 A1 | 9/2007 | Greaves |
| 2008/0034441 A1 | 2/2008 | Saha |
| 2008/0098454 A1 | 4/2008 | Toh |
| 2008/0165747 A1 | 7/2008 | Budka |
| 2008/0177766 A1 | 7/2008 | Park |
| 2008/0225738 A1 | 9/2008 | Virdhagriswaran |
| 2008/0256070 A1 | 10/2008 | Inglis |
| 2008/0288599 A1 | 11/2008 | Kutchmark |
| 2009/0138239 A1 | 5/2009 | Golani |
| 2009/0187601 A1 | 7/2009 | Sengupta |
| 2009/0199160 A1 | 8/2009 | Vaitheeswaran |
| 2009/0199196 A1 | 8/2009 | Peracha |
| 2009/0262650 A1 | 10/2009 | Shaikh |
| 2010/0082531 A1 | 4/2010 | Sakamoto |
| 2010/0121869 A1 | 5/2010 | Biannic |
| 2010/0146291 A1 | 6/2010 | Anbulselvan |
| 2010/0174718 A1 | 7/2010 | Chen |
| 2010/0274786 A1* | 10/2010 | Harris ................ H04L 45/7457 707/737 |
| 2010/0274810 A1 | 10/2010 | Walker |
| 2010/0325132 A1 | 12/2010 | Liu |
| 2011/0037625 A1 | 2/2011 | Joyce |
| 2011/0126169 A1 | 5/2011 | Moore |
| 2011/0145891 A1 | 6/2011 | Bade |
| 2011/0153616 A1 | 6/2011 | Torres |
| 2011/0225562 A1 | 9/2011 | Chidambarrao |
| 2012/0023117 A1 | 1/2012 | Butt |
| 2012/0054675 A1 | 3/2012 | Rajamannar |
| 2012/0060173 A1 | 3/2012 | Mainati |
| 2012/0091203 A1* | 4/2012 | Al-Omari ................ G06K 7/14 235/435 |
| 2012/0096558 A1 | 4/2012 | Evrard |
| 2012/0143912 A1 | 6/2012 | Horton |
| 2012/0166447 A1 | 6/2012 | Nice |
| 2012/0254224 A1 | 10/2012 | Thompon |
| 2012/0270505 A1 | 10/2012 | Prakash |
| 2012/0284369 A1 | 11/2012 | Fishgait |
| 2013/0036265 A1 | 2/2013 | Bert |
| 2013/0073576 A1 | 3/2013 | Lillethun |
| 2013/0103657 A1* | 4/2013 | Ikawa ................ G06F 16/2477 707/693 |
| 2014/0289702 A1 | 9/2014 | Mcmahon |
| 2015/0199414 A1 | 6/2015 | Braginsky |
| 2021/0067426 A1* | 3/2021 | Kakatkar ................ H04L 41/22 |

* cited by examiner

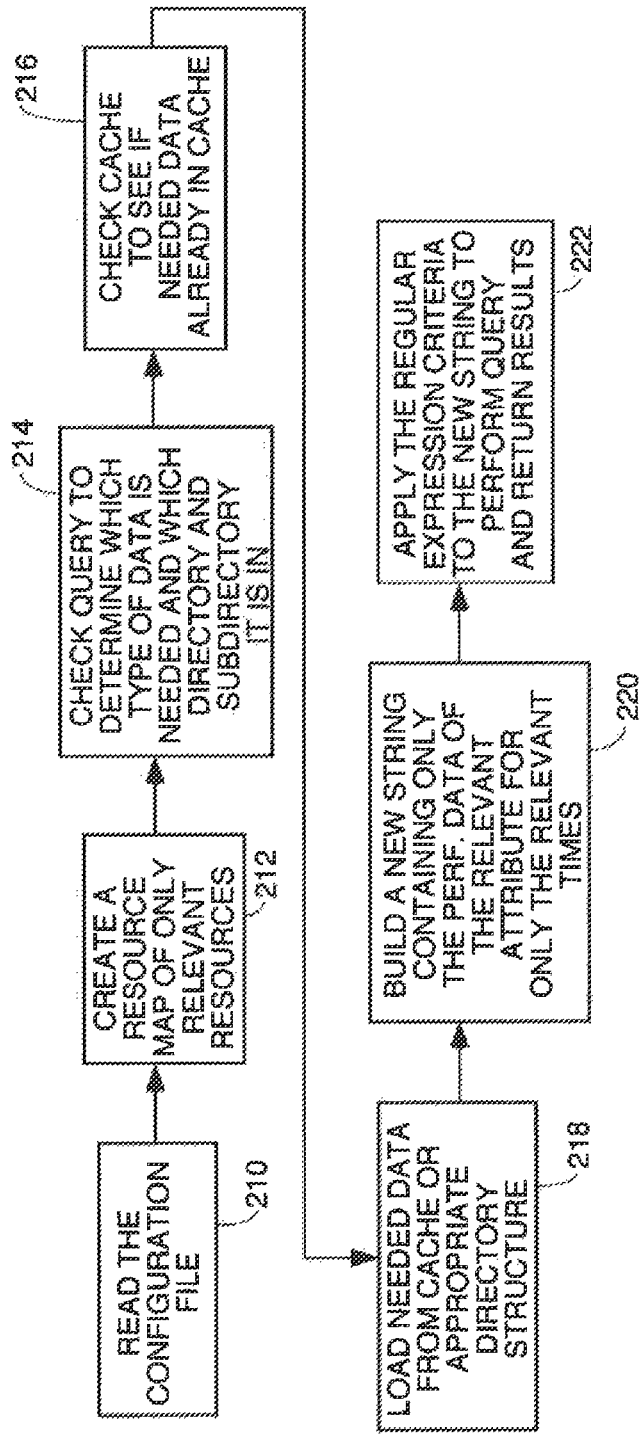

Figure 12:
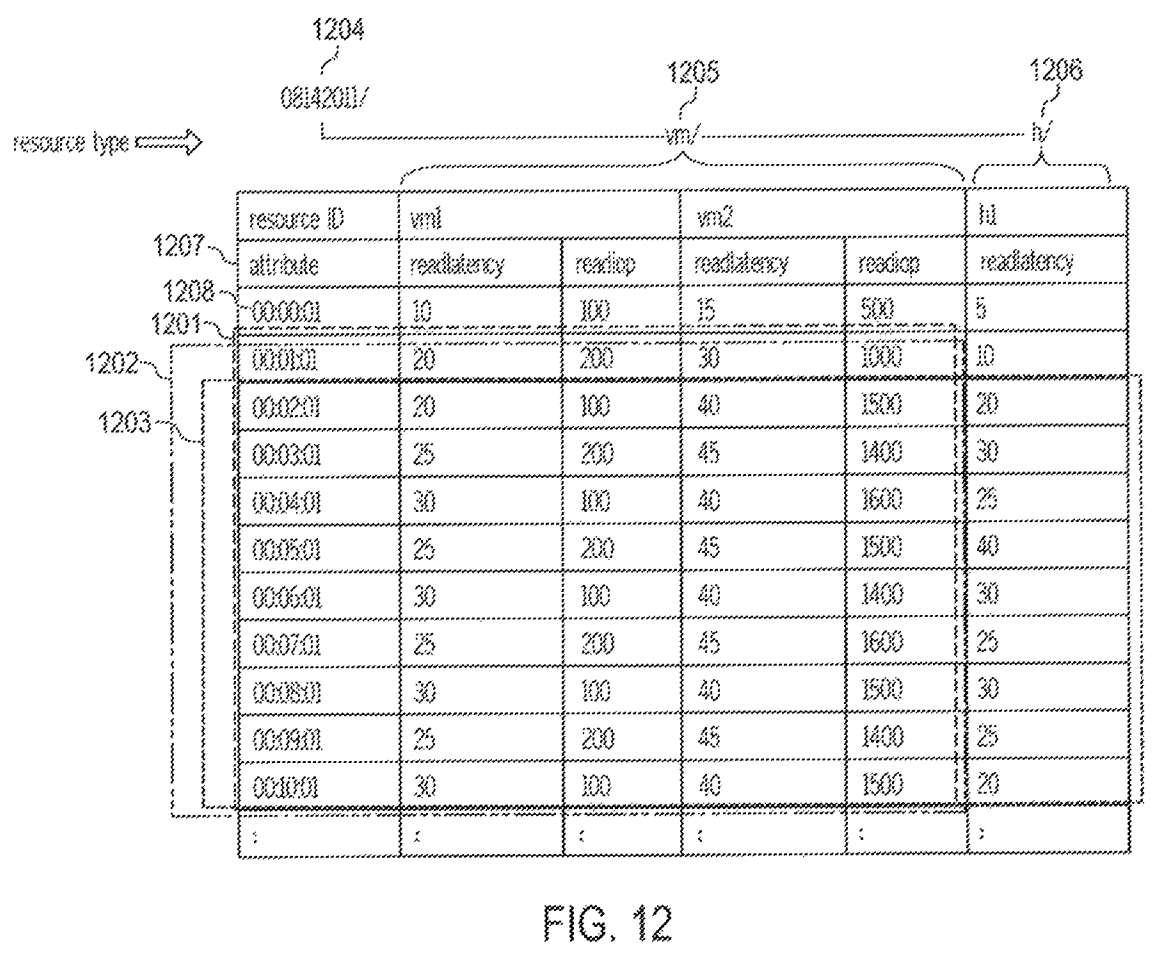

resource type ⟹

| resource ID | vm1 | | | | lv | |
|---|---|---|---|---|---|---|
| attribute | readlatency | readiop | readlatency | readiop | readlatency | |
| 00:00:01 | 10 | 100 | 15 | 500 | 5 | |
| 00:01:01 | 20 | 200 | 30 | 1000 | 10 | |
| 00:02:01 | 20 | 100 | 40 | 1500 | 20 | |
| 00:03:01 | 25 | 200 | 45 | 1400 | 30 | |
| 00:04:01 | 30 | 100 | 40 | 1600 | 25 | |
| 00:05:01 | 25 | 200 | 45 | 1500 | 40 | |
| 00:06:01 | 30 | 100 | 40 | 1400 | 30 | |
| 00:07:01 | 25 | 200 | 45 | 1600 | 25 | |
| 00:08:01 | 30 | 100 | 40 | 1500 | 30 | |
| 00:09:01 | 25 | 200 | 45 | 1400 | 25 | |
| 00:10:01 | 30 | 100 | 40 | 1500 | 20 | |

SYSTEM FOR ORGANIZING AND FAST SEARCHING OF MASSIVE AMOUNTS OF DATA

BACKGROUND OF THE INVENTION

In the management of IT systems and other systems where large amounts of performance data is generated, there is a need to be able to gather, organize and store large amounts of performance data and rapidly search it to evaluate management issues. For example, server virtualization systems have many virtual servers running simultaneously. Management of these virtual servers is challenging since tools to gather, organize, store and analyze data about them are not well adapted to the task.

One prior art method for remote monitoring of servers, be they virtual servers or otherwise, is to establish a virtual private network between the remote machine and the server to be monitored. The remote machine to be used for monitoring can then connect to the monitored server and observe performance data. The advantage to this method is that no change to the monitored server hardware or software is necessary. The disadvantage of this method is the need for a reliable high bandwidth connection over which the virtual private network sends its data. If the monitored server runs software which generates rich graphics, the bandwidth requirements go up. This can be a problem and expensive especially where the monitored server is overseas in a data center in, for example, India or China, and the monitoring computer is in the U.S. or elsewhere far away from the server being monitored.

Another method of monitoring a remote server's performance is to put an agent program on it which gathers performance data and forwards the gathered data to the remote monitoring server. This method also suffers from the need for a high bandwidth data link between the monitored and monitoring servers. This high bandwidth requirement means that the number of remote servers that can be supported and monitored is a smaller number. Scalability is also an issue.

Other non IT systems generate large amount of data that needs to be gathered, organized, stored and searched in order to evaluate various issues. For example, a bridge may have thousands of stress and strain sensors attached to it which are generating stress and strain readings constantly. Evaluation of these readings by engineers is important to managing safety issues and in designing new bridges or retrofitting existing bridges.

Once performance data has been gathered, if there is a huge volume of it, analyzing it for patterns is a problem. Prior art systems such as performance tools and event log tools use relational databases (tables to store data that is matched by common characteristics found in the dataset) to store the gathered data. These are data warehousing techniques. SQL queries are used to search the tables of time-series performance data in the relational database.

Several limitations result from using relational databases and SQL queries. First, there is a ripple that affects all the other rows of existing data as new indexes are computed. Another disadvantage is the amount of storage that is required to store performance metric data gathered by the minute regarding multiple attributes of one or more servers or other resources. Storing performance data in a relational database engenders an overhead cost not only in time but also money in both storing it and storing it in an indexed way so that it can be searched since large commercial databases can be required if the amount of data to be stored is large.

Furthermore, SQL queries are efficient when joining rows across tables using key columns from the tables. But SQL queries are not good when the need is to check for patterns in values of columns in a series of adjacent rows. This requires custom programming in the form of "stored procedures" which extract the desired information programmatically. This is burdensome, time consuming and expensive to have to write a custom program each time a search for a pattern is needed. As the pattern being searched for becomes more complex, the complexity of the stored procedure program also becomes more complex.

The other way of searching for a pattern requires joining the table with itself M−1 number of times and using a complex join clause. This becomes impractical as the number of joins exceeds 2 or 3.

As noted earlier, the problems compound as the amount of performance data becomes large. This can happen when, for example, receiving performance data every minute from a high number of sensors or from a large number of agents monitoring different performance characteristics of numerous monitored servers. The dataset can also become very large when, for example, there is a need to store several years of data. Large amounts of data require expensive, complex, powerful commercial databases such as Oracle.

There is at least one prior art method for doing analysis of performance metric data that does not use databases. It is popularized by the technology called Hadoop. In this prior art method, the data is stored in file systems and manipulated. The primary goal of Hadoop based algorithms is to partition the data set so that the data values can be processed independent of each other potentially on different machines thereby bring scalability to the approach. Hadoop technique references are ambiguous about the actual processes that are used to process the data.

Therefore, a need has arisen for an apparatus and method to reduce the amount of performance data that is gathered so that more sensors or servers can be remotely monitored with a data link of a given bandwidth. There is also a need to organize and store the data without using a relational database and to be able to search the data for patterns without having to write stored procedure programs, or do table joins and write complex join clauses.

BRIEF DESCRIPTION OF THE DRAWINGS

FIG. 6 is a template for a regular expression used to explain the syntax of a typical regular expression query.

FIG. 7 is a flowchart of one embodiment of the Query Request Handler module.

FIG. 12 is an example of time-series data.

DETAILED DESCRIPTION OF THE VARIOUS EMBODIMENTS

Figure 1:
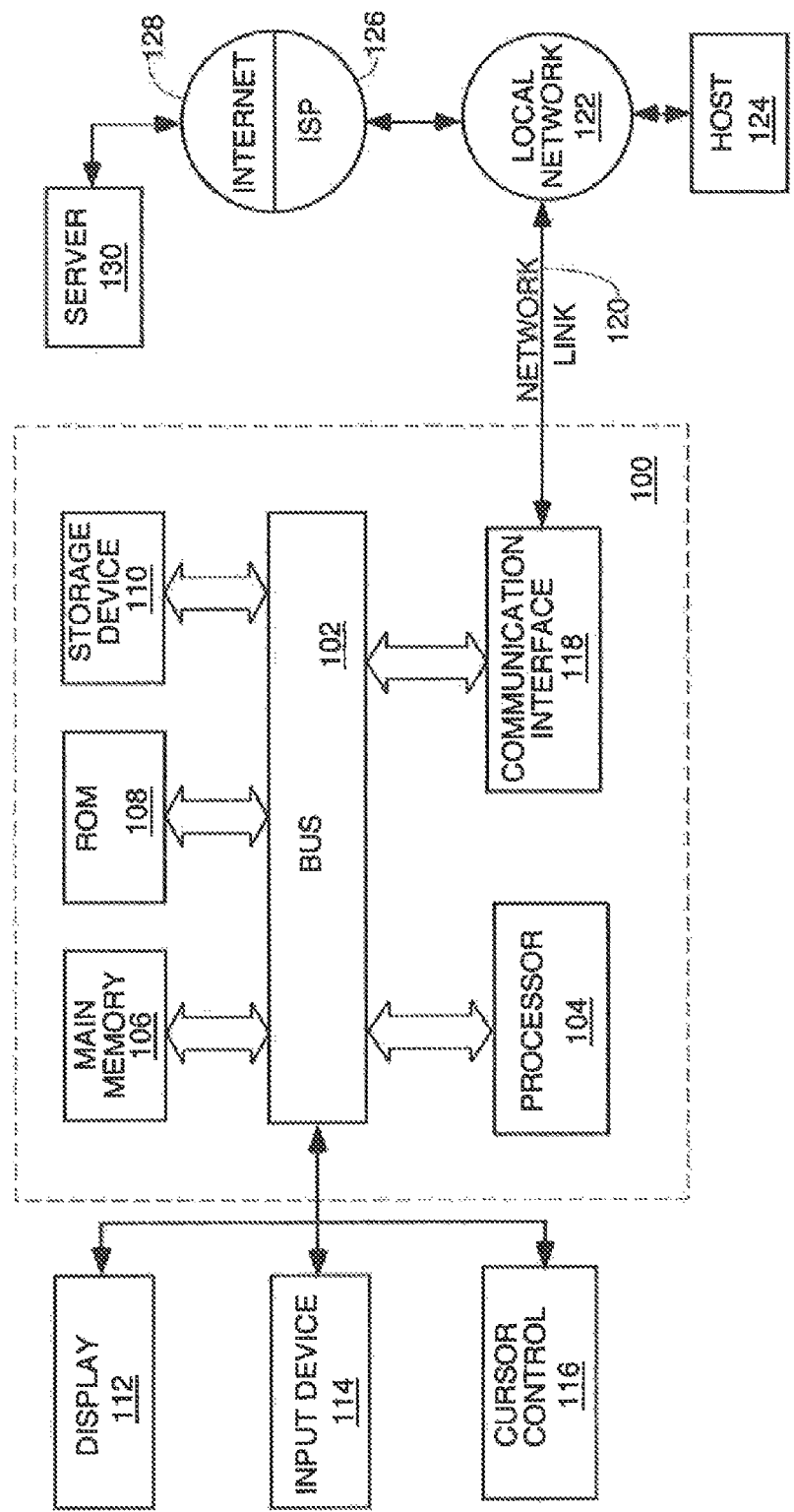
FIG. 1 is a block diagram of a typical server on which the processes described herein for organizing, storing and searching performance data can run.

There is disclosed herein apparatus and processes for infrastructure performance data analysis (and analysis of other large amounts of performance data) which uses search techniques instead of relational databases to store and organize data. Data is stored in a special folder and directory structure with one directory for every day's worth of performance data. This allows data to be collected, processed and stored at a faster rate. All the performance data collected from one or more resources in an IT environment or one or more sensors in some other environment on the day corresponding to the directory is stored in files within the directory. There is a subdirectory for each resource where the directory name is the signature for that resource. There is one file for a group of attributes. Each attribute file has N sections, one for each attribute defined to be in the group. Each section has M values, where M values comprise the entire times series of values for that attribute for the entire day corresponding to the resource.

The result is that all the collected performance data is stored as patterns; the patterns being data from many sources which are sorted and stored in a time series in the special directory structure described above; so all data from all sources for a particular day is stored in one directory structure. This data structure allows the data set to be searched with time as one axis and each data element as the other axis.

Attribute values are stored either as band values or delta values. Each value for an attribute for a particular reading on a particular day is stored as Java UTF-8 encoded string with each value encoded as a single Unicode character. In other words, the numbers of each performance metric value are converted to letters of a Java UTF-8 encoded string. This allows searching using standard regular expressions the syntax of which is known and comprises a form of formal language. The various elements of syntax can be used to construct search queries which search through the performance data for patterns. Regular expressions can only search text and not numbers and that is why the performance metric readings or values have their numbers converted to text before storage.

The syntax of regular expression is rich with tools that allow complex searches and pattern analysis simply by writing an expression of the proper syntax thereby eliminating the time consuming need to write a custom program or "stored procedure" in SQL to do the same thing in searching the data of a relational database.

Unicode is a computing industry standard for the consistent encoding, representation and handling of text expressed in most of the world's writing systems. It is a set of approximately 1 million characters that span from hex 0 to hex 10FFFF. There are enough Unicode characters to devote a single one to every symbol in the Japanese and Chinese languages and all the alphabets in the world and all the numbers in which performance metrics are expressed. Each performance metric value received from an agent is converted to one of these Unicode characters.

Searching the performance data with regular expressions defining particular patterns of data from certain resources which satisfy certain conditions expressed in the regular expressions is analogous to searching large amounts of text for keywords and reporting only those portions of the text which fit a certain semantic usage or search string. This means the data pattern can be identified by use of regular expression to define the search criteria or a nondeterministic automaton as an equivalent thereto by encoding in advance the measured data to a describable code, i.e., a code searchable by use of a regular expression.

Therefore, the system according to the claimed technology encodes the performance metric data using an encoding method such as the encoding method of Unicode which results in the performance metric data being converted into characters that can be searched using regular expressions. Specific examples of the code that can be used to encode the performance data include Unicode. The Unicode standard defines 110,000 codes, which is an amount enough to encode the numerical values of the performance metric data. The following description is made on the assumption that the encoding is performed by Unicode, but in a system according to the technology claimed herein, any encoding method other than Unicode can be carried out as long as the encoded performance data can be searched using regular expressions.

The use of regular expressions allows complex patterns of performance data to be searched without having to write complex, custom programs called "stored procedures" which would be necessary if a relational database was used to store the data and SQL was used to search the database.

The system claimed herein allows users to draft their search queries as regular expressions. The user must know the syntax of regular expressions in order to do this unless the user wishes to only use predefined searches which some embodiments of the claimed technology provide for selection and execution by a user. A regular expression provides a concise and flexible means for matching strings of text, such as particular characters, words, or patterns of characters.

A regular expression is written in a formal language that can be interpreted by a regular expression processor, a program that either serves as a parser generator or examines text and identifies parts that match the provided specification. In the preferred embodiment, the MARS query language detailed in Appendix A attached here is the formal language from which searches implemented using regular expression are expressed.

Storing the Unicode characters encoding the performance metric data in the special directory structure described herein eliminates the need for use of an expensive database system such as Oracle even where very large amounts of data are collected and stored.

The performance data is collected by agent programs which are coupled to the sensors or are programmed on the IT resources being monitored. These agent programs collect, compress and send the performance data over the data link to the remote monitoring server which collects it, converts it to Unicode and stores it in the directory structure defined above. The remote monitoring server also provides an interface for a user to compose regular expression search queries and also provided "canned" searches which can be run by a user, each canned search being a predefined regular expression which the user may modify slightly to suit his or her purposes.

The process and apparatus for collecting, storing and processing performance metric data differs from SQL Database technology in at least two ways. First, the partition algorithm stores performance data based upon time slices. By recording data based on the time slice, it is possible to reduce the cost for creation of Index relating to the time axis when the data is added, which can suppress influences on the performance of the database. This is important in order to speed up the data search in a time-axis direction and to maintain the performance of data addition.

Figure 2:
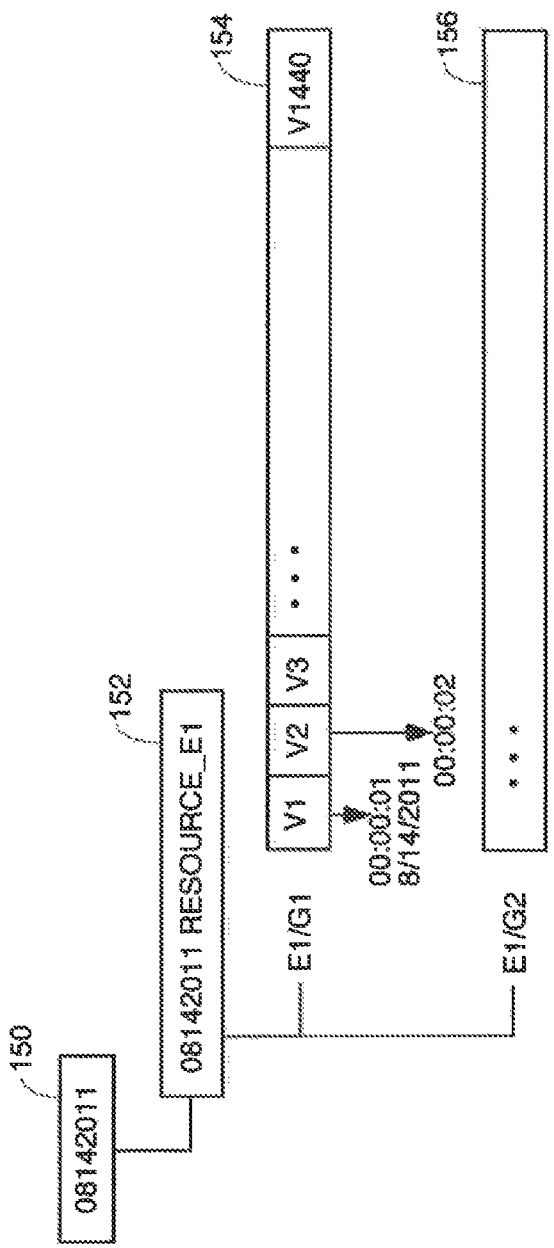
FIG. 2 is an example of a directory structure storing one day's performance data on a resource the performance of which is being monitored remotely.
Figure 3:
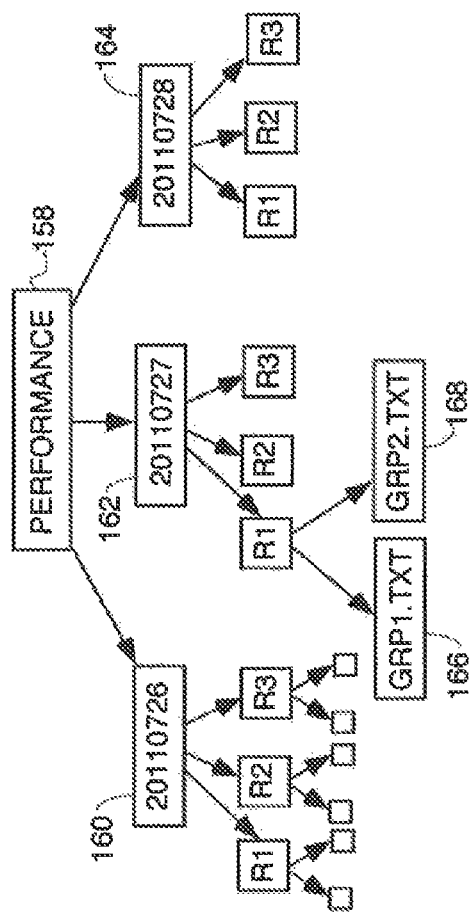
FIG. 3 is another example of a file system containing a separate directory for storing performance metric data for three different days for three different resources, each resource having two groups of attributes.

Further, by recording data by creating a slice for each data element in addition to the time slice, it is possible to perform the data search in the time axis and the axis of each data element. FIG. 2 and FIG. 3 are diagrams of a case where this method is realized for the directory structure and the file on the file system. The slice is realized by and implemented as the directory structure, and the data is recorded as a file on the file system. However, in addition thereto, by creating a key based on the date and the identifier of the data element and associating the key with the data, the same can be realized. The following description is made on the assumption that the above-mentioned method is realized by the directory structure and the file on the file system. In addition, combining the data by previously slicing the data by the time and the data element is important from the viewpoint of the reduction in the capacity at the time of compressing and storing the data. It is known that the data included in the same data element tends to assume a similar value and is therefore high in compressibility, i.e., the file size can be reduced by compaction programs.

Storing the data in time slices in the special directory structure, examples of which are shown in FIGS. 2 and 3, allows the data to be searched with time as one axis and each data element as the other axis. This is analogous to searching a large amount of text for keywords and then reporting only those portions of text that fit a certain semantic usage, such as matching the keywords.

Figure 22:
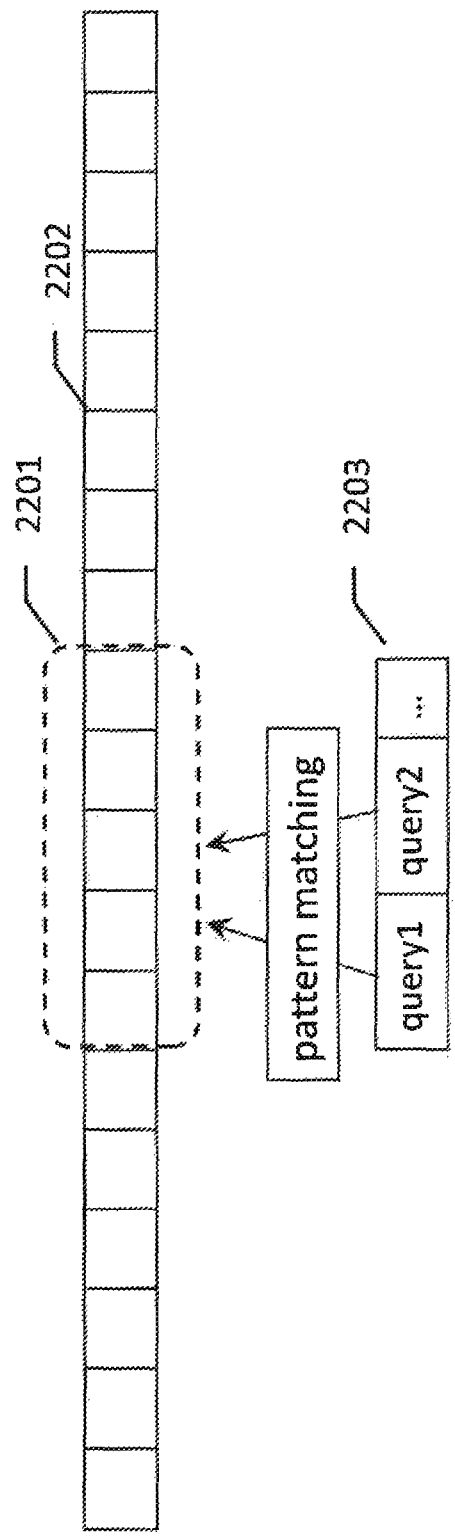
FIG. 22 is an example of pattern matching.
Figure 23:
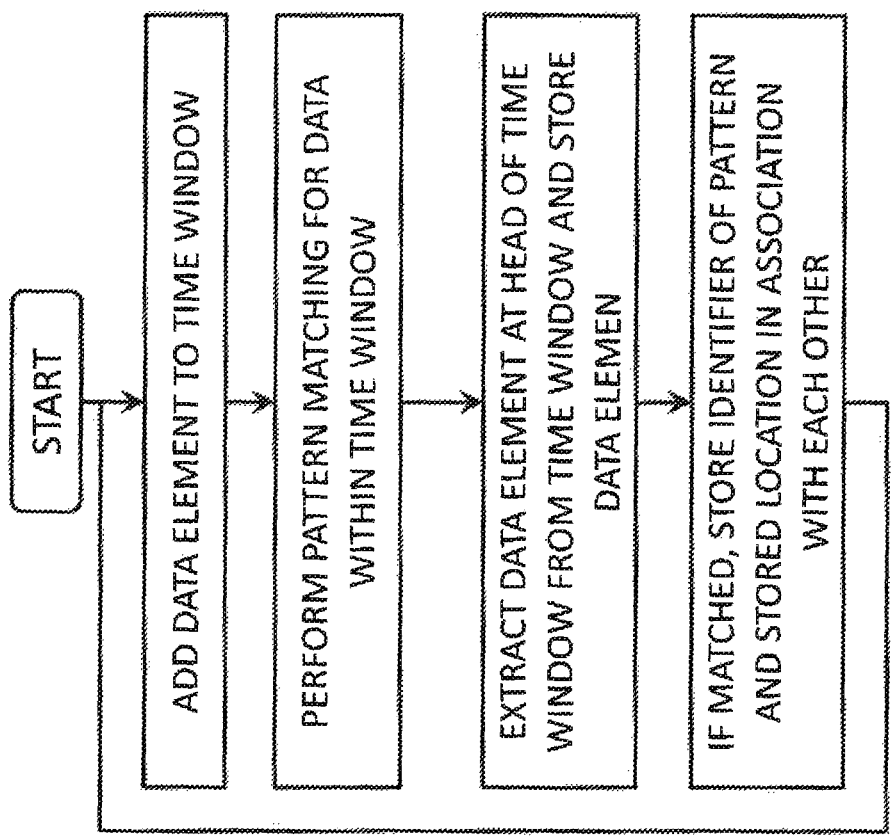
FIG. 23 is a flowchart of the processing.

Further, by using this method, it is also possible to speed up access to the stored data without affecting the entire database. In a case where the pattern that is often used for a search is known, such as a case where the data pattern that is often used for the search is registered in advance or a case where there is a tendency discernible from past searches or search results, it is possible to speed up the search using such a data pattern by performing the pattern matching before the storing. The processing performed at that time is described with reference to FIG. 22. FIG. 22 illustrates time-series data 2202 and a set 2203 of query data patterns that are often used for search. A time window 2201 represents a range of data that can be referred to when consecutive processing is performed for data that flows without interruptions such as the time-series data. In such a situation, it is possible to speed up the referring to the data stored by performing the processing as illustrated in FIG. 23.

First, after data is newly added to the time window, the pattern matching is performed for data included in the time window 2201 by using the known query data pattern 2203 that is often used for the search. After that, the data element at the head of the time window is extracted and stored, and if matched in the above-mentioned pattern matching at this time, it is predicted that the data is often referred to, and information relating to the stored location is stored together at the time of the storing.

The time required for this processing depends on the amount of data included in the time window and the number of data patterns used to perform the pattern matching. Further, the amount of data included in the time window normally has a size enough to be loaded in the memory. Therefore, there is a limitation on the referring to the data, which does not affect the entire database.

Figure 24:
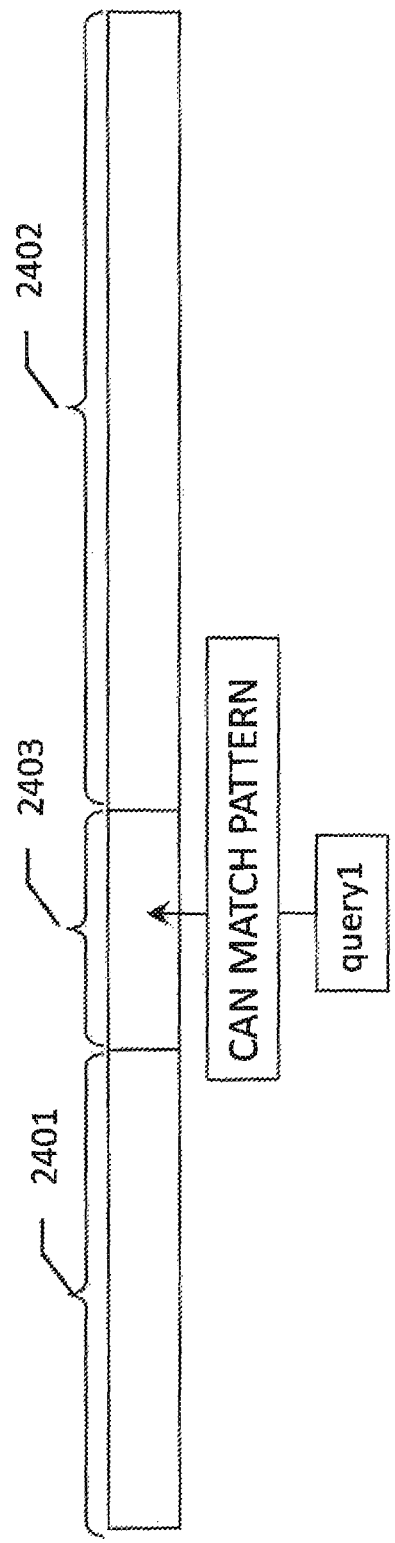
FIG. 24 is an example of pattern matching.
Figure 25:
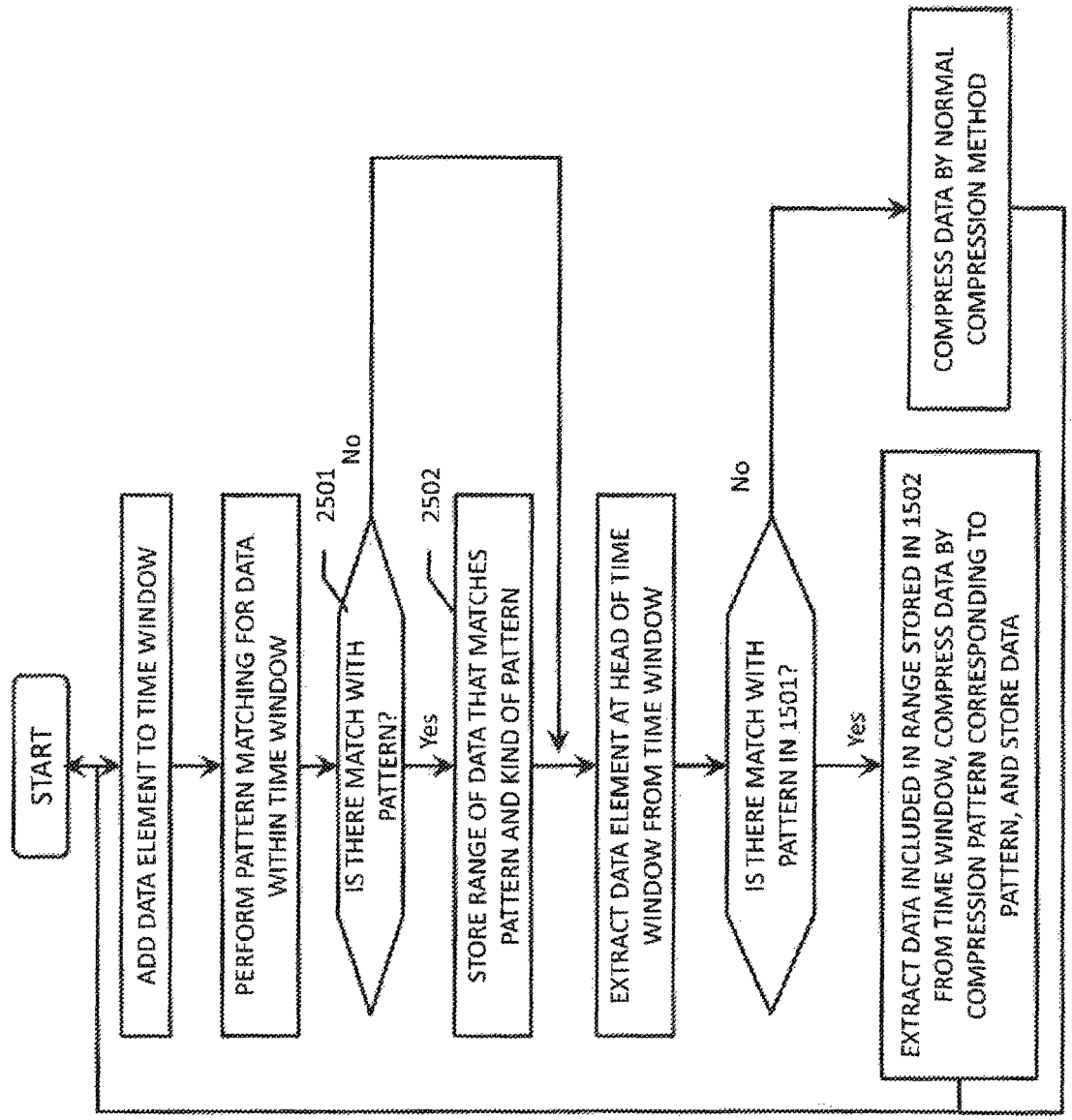
FIG. 25 is a flowchart of the processing.

In addition, in the above-mentioned example, the stored location of the data that matches the data pattern that is often used for the search is stored together, but in the case where the data is compressed and stored or other such case, it is conceivable that target data cannot be extracted without decompressing the whole time series of data containing the string which matched even when the stored place is known. In that case, this problem can be avoided by, as illustrated in FIG. 24, compressing and storing only the data matching the query data pattern 2203 that is often used for the search in the manner of being ready to be extracted. In FIG. 24, the partial syntaxes 2401 and 2402 are data stored by a normal compression method, and the partial syntax 2403 is obtained by separately compressing the data matching the query data pattern 2203 that is often used for the search. Further, FIG. 25 illustrates the flow of the processing performed at this time. The matching processing is performed for the data included in the time window in the same manner as in FIG. 23, but the different point is that, when the data matches the pattern (Step 2501: YES), the data is encoded by another encoding method and stored (Step 2502).

Figure 26:
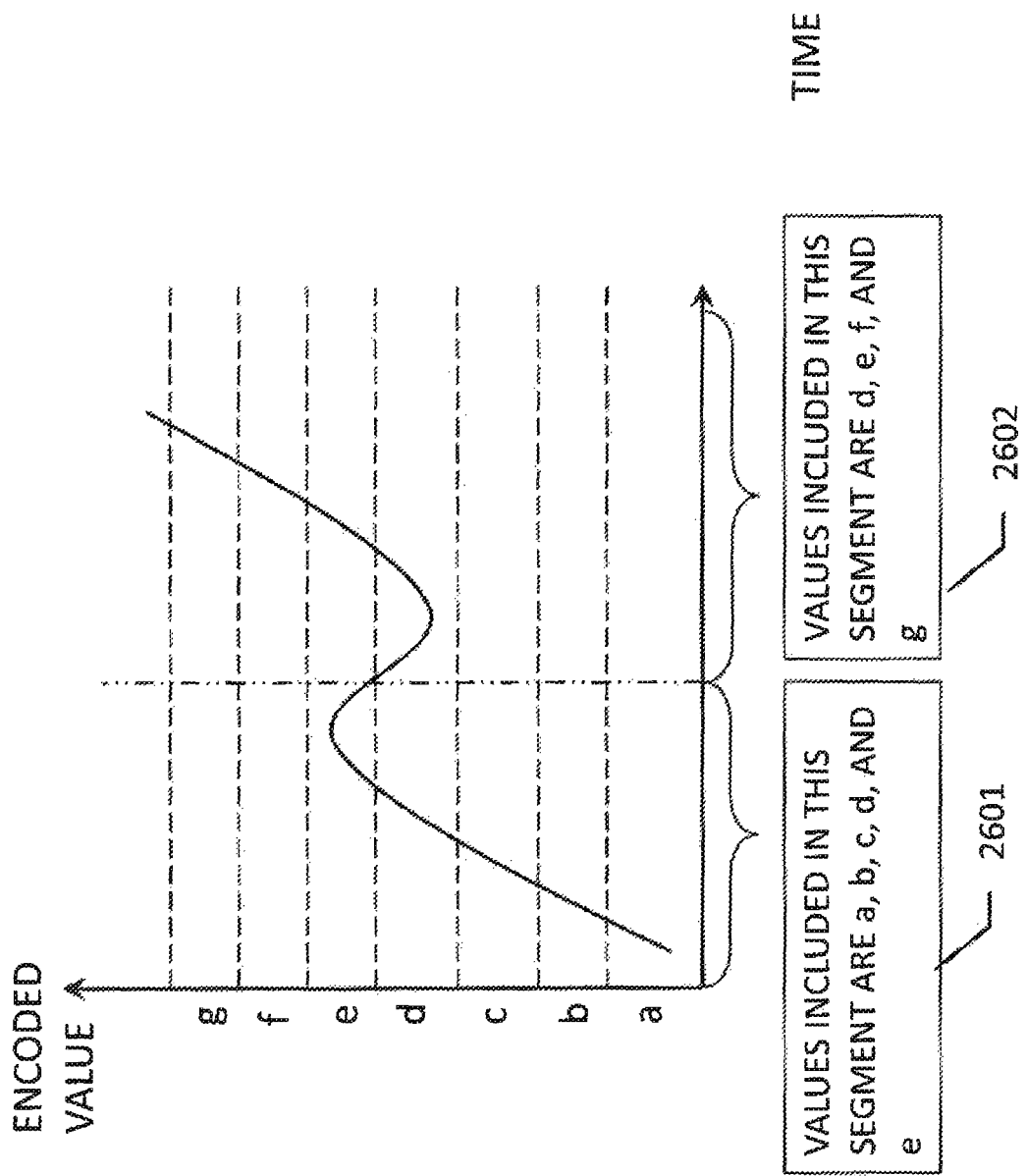
FIG. 26 is example of time slicing.

Note that, the size of the time slice used in this method is assumed to be specified in a range that allows the data search to be performed at a satisfactorily high speed, but there is a fear that the amount of data within the time slice may become too large due to a change in the sampling rate or the like. In such a case, aside from changing the size of the time slice, by calculating statistical values of the data included in a given time range and then storing the statistical values together, it is possible to speed up the referring to the data. FIG. 26 illustrates an example thereof. In this case, it is assumed that such data is stored in two time slices 2601 and 2602 which include data of a, b, c, d, and e and data of d, e, f, and g, respectively, as the statistical values. At this time, assuming that a search is performed for the data string of fg, by referring to the statistical values in advance, it turns out that there is no need to search the time slice 2601, which can reduce the time required for the search.

Figure 27:
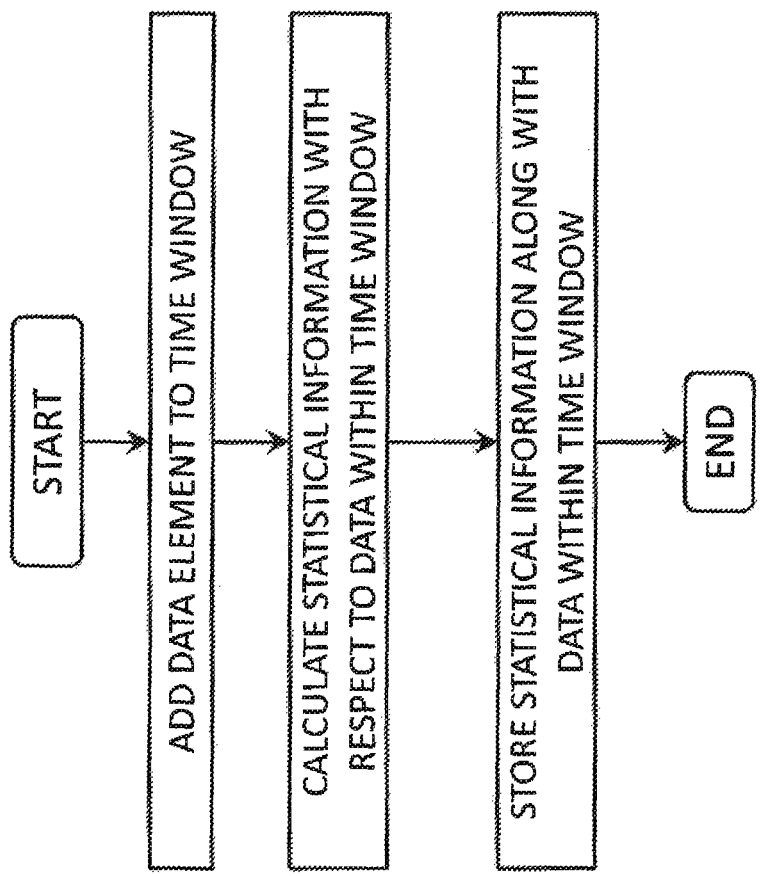
FIG. 27 is a flowchart of the processing.

FIG. 27 illustrates this flow. The statistical values are calculated with respect to the data included in the time window, and the results are stored along with the data. In this case, the range of data used to store the statistical values can be freely set in accordance with the degree of detail of the statistical values necessary for the data search, the response time obtained at the time of the data search, or the like, and the ranges of data may overlap with each other or may include data that does not include in any of the ranges.

The second difference between the claimed technology and the prior art is that the method of analysis and search of the performance data is based upon regular expressions which are used to search Unicode encoded text where the performance metric numbers have been converted to Unicode text characters. Regular expressions have a fixed, predefined syntax and semantics (together considered a grammar) and a variety of expressions can be formed using this syntax and semantics to search the performance data for patterns that meet criteria expressed in the regular expressions composed for the custom search. Regular expressions can be derived for all different kinds of search to limit the search to particular resources, particular attributes of those resources, particular days or particular time intervals during particular days, etc. Great flexibility is provided without the complexity and labor of having to write custom programs in the form of stored procedures to find the right data and analyze it.

The processes described here to search and analyze performance metric data are inspired by and somewhat similar to XPATH technology. XPATH is a technique used to traverse XML document data. XPATH-like techniques are used here to analyze infrastructure performance metric data and changes to that data over time. The processes described herein extend the XPATH notions to the search and analysis of data organized and stored by time slice which makes the search and analysis techniques taught herein efficient and fast. Search and analysis of the performance data is done using path-based techniques. A graph is created that represents the data. The graph G is a representation of vertex and edges (V,E). An edge connects two vertices and vertex has the ability to evaluate an expression and then, based on the expression, allow for a traversal through an appropriate edge.

FIG. 1 is a block diagram of a typical server on which the processes described herein for organizing, storing and searching performance data can run. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further usually includes a read only memory (ROM) 108 or other static storage device coupled to bus 102 for storing static information and instructions for processor 104. A storage device 110, such as a magnetic disk or optical disk, is provided and coupled to bus 102 for storing information and instructions. Usually the performance data is stored in special directory structures on storage device 110.

Computer system 100 may be coupled via bus 102 to a display 112, such as a cathode ray tube (CRT) of flat screen, for displaying information to a computer user who is analyzing the performance data. An input device 114, including alphanumeric and other keys, is coupled to bus 102 for communicating information and command selections to processor 104. Another type of user input device is cursor control 116, such as a mouse, a trackball, a touchpad or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The processes described herein to organize, store and search performance data uses computer system 100 as its hardware platform, but other computer configurations may also be used such as distributed processing. According to one embodiment, the process to receive, organize, store and search performance data is provided by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. One or more processors in a multi-processing arrangement may also be employed to execute the sequences of instructions contained in main memory 106. In alternative embodiments, hard-wired circuitry may be used in place of or in combination with software instructions to implement the invention. Thus, embodiments of the claimed technology are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media include, for example, optical or magnetic disks, such as storage device 110.

Volatile media include dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in supplying one or more sequences of one or more instructions to processor 104 for execution. For example, the instructions may initially be borne on a magnetic disk of a remote computer. The remote computer can load the instructions into its dynamic memory and send the instructions over a telephone line using a modem. A modem local to computer system 100 can receive the data on a telephone line or broadband link and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of broad band link to the internet. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120, and communication interface 118. In the Internet example, a server 130 which is having its performance data monitored might transmit performance data via an agent program that collects it through Internet 128, ISP 126, local network 122 and communication interface 118 to computer system 100. The received performance data is stored and can be searched by the processes described later herein.

Figure 4:
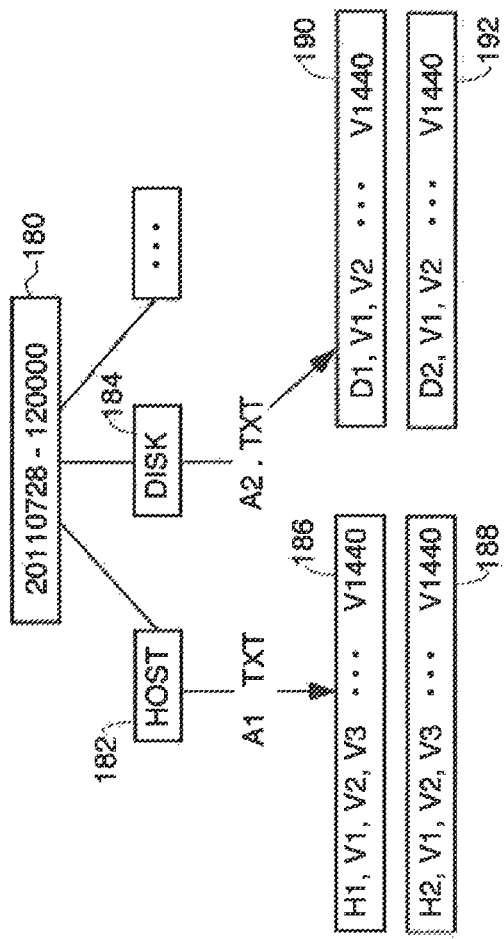
FIG. 4 is a diagram of the directory structure of an example of data collected by a probe.

The system according to the claimed technology has on the software and data side the following components which are executed and stored on the hardware platform described above or similar.
Data Store Manager;
Query Request Handler;
Data Access Manager;
Probe Interface; and
Proprietary non-relational database referred to as the NRDB and detailed in the Directory Structure heading below and illustrated in FIGS. 2 and 3
Data Store Manager This component receives data from probes in a well defined format, and stores the received data in the NRDB. A probe is an external software program which collects data on a periodic basis from an external data source and writes data into a format which can be processed by Data Store Manager. The Data Store Manager can have any program structure so long as it can receive data in the probe data format described elsewhere herein, decompress it and store it in the NRDB in the directory structure and data format described herein for the NRDB. In the preferred embodiment, it will have a program structure which can perform the processing of the flowchart of FIG. 5. It can run on any off the shelf computer having sufficient speed, memory capacity and disk capacity to store the performance data being collected.
Query Request Handler This component accepts search queries from external applications or users, and sends back the results. The query language is a proprietary syntax for regular expressions which is given below under the Query Definition Language Heading, and which provides constructs for specifying search patterns to analyze data. The Query Request Handler can have any program structure which can receive query requests with regular expressions embedded therein having the syntax described below, and parse those queries and perform the processing of the flowchart of FIG. 7. It can run on any off the shelf computer having sufficient speed, memory capacity and disk capacity to store the performance data being collected.
Data Access Manager This component provides access to the data stored in the claimed technology's proprietary non-relational database (NRDB). This component internallyemploys standard caching techniques to provide results faster. The Data Access Manager can have any program structure which can access directory structures like those of the NRDB of which FIGS. 3 and 4 are examples, and which supports the Query Request Handler requests for data from the NRDB to perform the processing of the flowchart of FIG. 7. It can run on any off the shelf computer having sufficient speed, memory capacity and disk capacity to store the performance data being collected.
Probe Interface
NRDB All the data in the claimed technology is stored in NRDB. NRDB uses a normal file system consisting of files and folders. It uses a special folder structure and special encoding of data files to optimize the storage and access of data.

The entire software that implements the Data Store Manager, the Search Handler, the Data Access Manager and the Probe Interface, in the preferred embodiment is designed to run on commodity hardware inside a Java virtual machine. Commodity hardware is defined as regularly available Intel x86/64 architecture based computers. Standard Linux distribution such as CentOS is used as the base operating system.

As an example of how the system works to collect performance metric data and analyze it, suppose server 130 is a server which has a couple of virtual machines running on it the performance of which is to be monitored. The performance metric data for each virtual machine is collected by an agent or probe process (not shown) or, in some embodiments, a separate probe process for every virtual machine. The performance data is gathered on a per day basis to measure various performance metrics on server 130. Performance data of the server 130 itself such as CPU cycle utilization, hard disk access time, hard disk capacity, etc. may also be gathered. There are usually several metrics that are measured simultaneously, often on a per minute basis.

This performance metric data gathered by the agent process is compressed and packetized and the packets are sent over the internet 128 to ISP 126 to which a local area network 122 is connected. The local area network is coupled via a network line 120 to the communications interface 118 of the monitoring server system 100.
Probe Data Format The performance metric data for every element is collected by a probe. A probe is a program running on the computer having the element or attribute being monitored. The probe for each element periodically or sporadically (usually a call is made every minute) makes application programmatic interface calls to the operating system of the computer or other machine to gather the performance data on the element it is monitoring. The probes can be any agent hardware and/or software combination that can collect the desired performance metric data and put it into the data format described below for probe data.

Probes don't have to be just for IT attributes. They can also gather data for mechanical structures or automotive systems. For example, engineers designing bridges may attach temperature and strain sensors at various positions on the structures, each of which is read by a probe program running on a computer which periodically interrogates each sensor from time to time, takes its reading and sends it elsewhere for storage and analysis. The probe gathers all the sensor data, formats the data into the data structure format described below, compresses the data structure and packetizes the compressed data for transmission over any data path to a system elsewhere for analysis. Likewise for cars, engines, etc. The probe system is more or less like the modern day equivalent of telemetry systems used on satellites and missiles that feed performance data back to an earth station by a radio telemetry link.

The performance metric data values gathered by the probes are typically packetized for transmission over the internet. The primary objective of the probe data format is to reduce the amount of data which probe will produce so as to reduce bandwidth requirements on the data link over which the probe data is sent. This reduces the amount of storage required to store the data and also makes the transmission to another location faster. The probe programs do not do the conversion of the performance metric data to Unicode in the preferred embodiment, but in some alternative embodiments, they could.

The probe collects all the attribute data for one day on all the elements it is monitoring and creates a directory structure such as the one shown in FIG. 4. The directory structure contains files which store the time series of attribute values (performance metric data) for every attribute for which the probe collected data. The attribute values are numbers and are not converted by the probe to Unicode values. That happens at the monitoring server end.

In FIG. 4, block 180 represents the top level directory, block 182 represents a folder for all host type elements, block 184 represents a folder for all disk type elements being monitored. Each of the folders 182 and 184 preferably contains a text file which contains the attribute values obtained by the probe for every element being monitored of the type symbolized by the subdirectory. Each text file preferably contains all the performance metric values for all the monitored elements in the same group with one row containing the performance metric values measured for one of the elements being monitored in that group. For example, the host folder 182 may have a single text file A1.txt, but that file preferably contains multiple rows, one for each host element being monitored. For example, blocks 186 and 188 contain the performance metric values for two particular hosts being monitored in the group within A1.txt called H1 and H2. H1 and H2 in blocks 186 and 188 represent unique strings uniquely identifying the hosts for which the performance metric data was collected. H1 has 1440 performance metric measurements stored in the row symbolized by the V1, V2 . . . V1440 values in a comma delimited list. For host H1, a performance value was measured every minute. The same is true for host H2. Blocks 190 and 192 preferably contain performance metric values collected by the probe for two disks D1 and D2 in the group of monitored elements "disk" represented by folder 184. These performance metric values for disks D1 and D2 are preferably stored in different sections or rows of a text file named A2.txt.

The whole collection of data files and subdirectories is preferably zipped by the probe into one zip file which is a compressed version of the data structure. By sending a compressed version of the data, the bandwidth requirement on the data path between the probe and the monitoring server(s) is greatly reduced. When the zip file is unzipped, the data structure like that in FIG. 4 (or whatever the data structure is the number of elements and attributes being monitored) results.

Any payload produced by the probe must conform to the following structure:
The first file named ListOfFiles<YYYYMMDD_HHmmSS>_<base64 encoded text of encrypted value of (SiteName+"_"+ServerName+"_"+ArraySerialNumber)>_<ProbeTypextxt
  Each line inside this file preferably has the name of a file which is part of this payload
    If the file has configuration or events data, the file must be named Conf<YYYYMMDD_HHmmSS>_<base64 encoded text of encrypted value of (SiteName+"_"+ServerName+"_"+ArraySerial Number)>_<ProbeType>.zip.enc
    If the file has performance data, the file must be named Perf<YYYYMMDD_HHmmSS>_<base64 encoded text of encrypted value of (SiteName+"_"+ServerName+"_"+ArraySerial Number)>_<ProbeType>.zip.enc
Where:
  SiteName—name of the site assigned for the probe
  ServerName—name of the entity from which data is being collected, it is the text filled in by the user during probe configuration.
  ArraySerialNumber—Optional additional information to further identify the entity.
  ProbeType—Type of entity from which data is being collected—VMWare, SMIS, NetApp, Amazon ECS, Bridge Sensors
One or more .zip file are identified in the list of files
The configuration zip file preferably contains one or more files which can be of two types:
  Snapshot
  Mini-snapshot
Snapshot
The snapshot type file preferably contains the entire configuration about the data source to which the probe is connected. The name of this file is: <Site Name>_<DataSource>_snapshot_<YYYYMMDD>_<HHMMSS>_<Version>.txt, where:
  2. <Site Name>: Identifier for location (actual physical site) where the probe is situated
  3. <Data Source>: Identifier for the data source (resource, i.e., host, disk array, printer, etc.) from which the data is being collected
  4. <YYYYMMDD>_<HHMMSS>: The date and time when the snapshot was made
  5. <Version>: Version of the file.
The file format of snapshot is preferably as follows:

```
%meta
  probe_id:<Identifier>
  probe_type:<Probe Type>
  probe_site:<Site Name>
  probe_server:<Server Name>
  probe_version:<Probe Version>
%meta
{
  t:<YYYYMMDD_HHMMSS>
  {
    R:<ResourceType>#<Resource Id>
    O:{<ResourceType>#<Another_Resource_id>,}+?
    b: <Begin Time YYYYMMDD_HHMMSS >?
    e:<End Time YYYYMMDD_HHMMSS >?
    a:{<Attribute Id>=<Attribute Value>}+
```

-continued

```
r:{<Resource Type>#<Resource Id>,}+
$:{<Event Id> <space><Event String>}+
}+
}+
```

Example

%meta
probe_id:Cust_192.168.0.63
probe_type:VMWare
probe_site:Cust1
probe_server:192.168.0.63
probe_version:10
%meta
t:20110624_062248
R:ds#Cust_192.168.0.63_datacenter-2
a:name=MTNVIEW
R:ds#Cust_192.168.0.63_datacenter-205
a:name=FAS960_home
a:capacity=51322806272
a:freeSpace=42685091840
a:uncommitted=17323200512
a:provisionedSpace=25960914944
a:type=NFS
a:URL=netfs://192.168.0.50//vol/vol0/home/
a:sioc=disabled
r:h#Cust1_192.168.0.63_host-171,
R:ds#Cust1_192.168.0.63_datastore-10
a:name=Storage1
$:AlarmSnmpCompleted Alarm 'Host error'—an SNMP trap for entity 192.168.0.48 was sent Updates As configuration changes and configuration related events occur, they preferably will be written to a mini snapshot file. The name of this file will be:
<Site name>_<Data Source>_minisnapshot_<YYYYMMDD>_<HHMMSS>_<version>.txt<YYYYMMDD>_<HHMMSS>:

The format of this file is preferably exactly same as the snapshot file. The primary difference is that it will only have a subset of the data of the snapshot type of file. The subset captures the changes which have occurred in configuration data since the last time a snapshot file was made.

Performance Data

The performance data is a zip file which preferably has the following directory structure:
2. <YYYYMMDD_HHMMSS>—This directory name is the start time of the time series specified in this data set
3. <Resource Type>—One directory for each resource type
4. <Attribute Id>.txt—One file for each performance metric Each <Attribute Id>.txt has one or more lines where each line has the following format:
<Resource Signature> ',' {Value} ',' {',' <Value>}+
The value list is a time ordered series of values for that performance metric for the resource specified at the beginning of the time. If the metric value does not exist for a particular point in time, then a blank or empty value is allowed.

NRDB File System Structure

The performance metric data is preferably stored in a filesystem structure as defined below. One directory is preferably created for each day in the format YYYYMMDD. All performance data for all the resources in the data model for a particular day are preferably stored in this directory. Under this directory, there is preferably a directory for each resource where the directory name is preferably the signature of that resource. Under this directory, there is preferably one file for a group of attributes. The directory will preferably look something like this:
   <YYYYMMDD>—One Folder for each day
      <Resource Type>
         <AttributeGroupId>.perf
  5. <YYYYMMDD_HHMMSS>—This directory name preferably contains the start time of the time series specified in this data set
  6. <Resource Type>—preferably one directory for each resource type
      <Attribute Id>.txt—preferably one file for each performance metric <AttributeGroupId>.perf file preferably stores processed values for each sample in a compressed format. This format is now described in detail. The file is preferably divided into "n" number of sections. Where "n" is the attributes which are defined to be in the same group. Each section preferably will hold "m" number of values—the entire time series values of that day for that resource's attribute. So, for example, if the probe sampling interval is 1 minute then there will be 1440 (1440 minutes in a day) values. Each <Attribute Id>.txt preferably has one or more lines where each line has the following format:
<Resource Signature> ',' {Value} ',' {',' <Value>}+

The value list is preferably a time ordered series of values for that performance metric for the resource specified at the beginning of the time. If the metric value does not exist for a particular point in time, then a blank or empty value is allowed.

Currently, corresponding to each raw value of a performance metric attribute received from the probe, preferably two types of processed value are stored:
  Band value
    An attribute can define the "fidelity" with which it will store the raw value. This is called in Band Factor. Band factor is preferably an integer with a minimum value preferably of 1 and maximum of preferably any positive integer value. With a band factor of 1, there is no loss of fidelity. The processed value is same as raw value. With a band factor 10, the processed value will preferably be $1/10^{th}$ of the raw value rounded to the nearest integer.
  Delta value
    It is preferably the change in percentage from band value at time t−1 and band value at time t.

Each set of 1440 values of a performance metric attribute (assuming one value is measured every minute) are stored preferably as a Java UTF-8 encoded String. Each performance metric attribute value is preferably encoded as a single Unicode character in the String.

FIG. 2 is an example of a directory structure storing one day's performance data on a resource the performance of which is being monitored remotely. The processor 104 in FIG. 1 is programmed by instructions stored in main memory 106, according to one embodiment of the invention, to create a special directory structure with preferably one directory for each day's worth of data, and preferably one subdirectory for each resource for which performance metric data is being received. In FIG. 2, block 150 represents the directory created for storing the performance metric data collected on Aug. 14, 2011. The subdirectory represented by block 152 represents the subdirectory where performance data for the resource E1 is to be stored. Suppose in this example, that resource E1 is the server 130 in FIG. 1.

Each subdirectory preferably has the directory name in its signature. In this case, subdirectory 152 has 20110814 in its directory name which is preferably the name of the directory of which it is a part.

Each subdirectory preferably contains one attribute file for each group of attributes that are being measured by the performance metric data that stores performance metric values. Each attribute file preferably has N sections, one section for each attribute defined to be in the group for which the file was created. Each section preferably holds M performance metric values for the particular attribute whose values are recorded in that section. That section's data preferably comprises the entire time series of values for the attribute to which the section is devoted.

In the example of FIG. 2, there are only two groups of attributes in subdirectory 152 so there are only two files 154 and 156. Suppose each of these files represents one of the virtual machines running on server 130. Each file is a time slice of performance metric data values that records the entire day's worth of a metric in the section of that file devoted to storing values for that performance metric. Typically, if a metric has a measured value every minute, the section of the file devoted to that metric will have 140 comma delimited values for that metric encoded as a Java UTF-8 encoded string. UTF-8 is a multibyte character encoding for Unicode. UTF-8 can represent every character in the Unicode character set. Each of the 1,112,064 code points in the Unicode character set is encoded in a UTF-8 string comprised of one to four 8-bit bytes termed octets. The earlier characters in the Unicode character set are encoded using fewer bytes leading to greater efficiency. The first 128 Unicode character set coincide with the 128 ASCII characters.

The system of the claimed technology has a mapping table that maps performance metric values into Unicode characters and then encodes them with UTF-8. Since Unicode only supports positive values, the Unicode range is split and a first range of Unicode values is mapped to positive performance metric values and a second range of Unicode values is mapped to negative performance metric values.

However, this mapping method is merely an example. By examining the occurrence frequency of the values and assigning the code having a small size to the value having a high occurrence frequency, it is possible to reduce the storage size necessary to store the data. Further, if the distribution of the values differs depending on a kind of performance metric value and a time slot (time slice) for the measurement of data, by changing the mapping depending on the kind of performance metric value and the time slot for the measurement of data, it is possible to realize further reduction in the storage size necessary to store the data. In addition, a mapping method which assigns (quantizes) a plurality of values to one code at the time of the mapping is conceivable, but by adjusting a range of quantization in that case in accordance with a degree of detail (resolution) obtained when the data is used, it is possible to reduce the number of necessary codes. As a result, it is possible to use codes having a short code length, which can realize a reduction in the necessary storage size.

Each performance metric value from a measurement is encoded as a single Unicode character in the hexadecimal number system (hex).

Each new day's worth of data from all resources and all probes is preferably stored in a new directory structure. The names of the directories, subdirectories and files preferably include information about the day during which the data was gathered, the resources from which it was gathered and the particular group of attributes whose performance metric data is stored in the various sections of the file.

In the example of FIG. 2, the directory structure 150 has files 154 and 156 for one day of metric data gathered every minute for two different metrics from the same resource, represented by subdirectory 152. In other words, there is only one resource being monitored. Also, for the example of FIG. 2, there is only one attribute in each group of attributes and only two attributes in total have performance metric data gathered. The performance metric data is gathered on Aug. 14, 2011 so the directory 150 created to store that day's metric data is named 20110814. There is only one resource being monitored called E1 so there is created a subdirectory 152 called 20110814_E1. That subdirectory contains two files. The first file 154 is named E1/G1, and it stores the metric values for metric M1 in group 1 (which has only one section because there is only one metric M1 in the group E1/G1). The values of metric M1 are gathered every minute and are symbolized as values V1 through V1440 which are stored as a comma delimited list. The value V1 is the value of metric M1 taken at time 00:01:01 on 8/14/2011, i.e., the first minute of 8/14/2011. The value V2 is the value of metric M1 taken at time 00:02:01 on 8/14/2011, the second minute of 8/14/2011. The value V1440 is the value of metric M1 taken at time 23:59:01 which is the last minute of 8/14/2011. Therefore, the position of any particular value on the comma delimited list denotes the time at which the value was captured on 8/14/2011.

The second file 156 in the resource E1 subdirectory is named E1/G2 and it stores values for a metric M2 in group 2 (which also only has one metric in the group so there is only one section in the file). It has not been shown in detail since it has the same structure as the file E1/G1.

The values stored in each position of the file are preferably Unicode encoded meaning the numeric value of the metric's value has been mapped to a text character or string of characters in the encoding process. Other encoding processes which convert numeric values to text values could be used in other embodiments.

This allows these values to be searched using regular expressions which are a form of formal language (used in the sense computer scientists use the term "formal language") which has predefined rules of syntax and semantics (together called its grammar). The elements from which regular expressions can be formed are known and each element has its own known syntax for how it is structured and has its own unique and known semantics defining what it means. Persons wishing to analyze the performance metric data in any way, can compose a regular expression using the available elements for composing a regular expression and their syntax and semantics. Any regular expression syntax can be used to carry out the teachings of the invention, but the claimed technology uses a proprietary syntax which is optimized for the application and is disclosed elsewhere herein.

FIG. 3 is another example of a file system containing a separate directory for storing performance metric data for three different days for three different resources, each resource having two groups of attributes. The file system storing metric data is represented by block 158. Three days of performance data are stored in directories 160, 162 and 164, respectively. Each of these directories has three subdirectories named R1, R2 and R3, each of which is a folder which contains actual files of text data encoding performance metric values that have been measured and transmitted by the agents. Blocks 166 and 168 represent comma delimited text files named GRP1.TXT and GRP2.TXT storing the performance metric data gathered on Jul. 27, 2011 for resource 1 for group 1 and group 2 attributes, respectively.

The reason for grouping different attributes performance values in the same file is for speed of loading and analysis. Typically, an analysis of a resource will involve looking at patterns or values or value changes of several different attributes over a particular interval. If the attributes involved in the analysis are all grouped in the same group, they will preferably be stored in the same file. In this way, all the data needed to do the analysis can preferably be loaded into memory for analysis simply by reading the appropriate file containing the attribute group for the resource under analysis from the directory structure corresponding to the day of interest. That file is loaded into memory by a standard file access call to the operating system, and the regular expression search or searches can be performed on the data. This is faster than having to load several different files or having to do SQL queries to a database which would require a larger number of reads.

Figure 5:
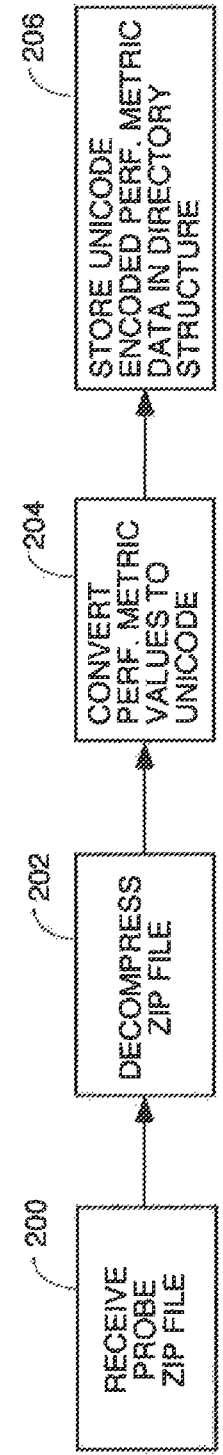
FIG. 5 is a flowchart of the high level process the monitoring server performs to receive probe data and stored it in the directory structure for search and analysis.

FIG. 5 is a high level flowchart of the process the monitoring server preferably performs to receive the zip files of performance metric data from a probe, recover the data and store it. Block 200 represents the process of receiving the zip file of performance metric data from the probe. Block 202 represents the process of decompressing the zip file to recover the data structure such as that shown in FIG. 4. Block 204 represents the process of converting the numerical performance metric values stored in the text files to Unicode characters using a mapping table the server uses for such purposes. Block 206 represents the process of storing the Unicode data structure derived in step 204 in the appropriate parts of the NDRB data structure. Usually this just entails storing the entire directory and all its files on disk since the data structure is already structured as one directory for the particular day on which the data was collected with individual text files of metric data for each element being monitored in subdirectories for the type of element each text file represents.

Example of How A Regular Expression Can be Used to Analyze the Metric Performance Data Suppose an analyst wanted to know if CPU utilization was between 90% and 100% for at least 5 minutes or more. The regular expression syntax to make a search and analysis of the performance metric data for CPU utilization would be in generic syntax:
[U90-U100]{5,}

To convert this regular syntax to take into account the Unicode encoding of the CPU utilization metric values, suppose a CPU utilization metric value representing 90% utilization is mapped to Unicode hex character a, 92.5% CPU utilization is mapped to Unicode hex character b, 95% to hex character c, 97.5% to hex character d, and 100% to hex character e. If CPU utilization metric values are measured every minute, then a regular expression to determine if the CPU utilization was between 90% and 100% for at least 5 minutes would be:

[a-e]{5}which means if five consecutive values in the file storing CPU utilization values for the CPU in question on the day in question were any combination of hex characters a through e, then the expression evaluates to true. This means that every time on that particular day the CPU utilization metric values had five consecutive values which were any combination of hex a through hex e, then for each of those intervals, the CPU utilization was between 90% and 100%. This may mean the CPU is maxing out and another CPU should be added.

In the preferred embodiment of the claimed technology, the user must know the syntax of regular expressions in order to compose his or her query. In alternative embodiments, a user interface is provided which allows the user to think in the problem space and compose his queries in plain English, and the system converts that query into the proper syntax for a regular expression which will perform that query and analysis. In some embodiments, the software portion of the system of the claimed technology presents a user interface which has a set of predefined searches which the user can use to do various forms of analysis. Each predefined search, when selected causes a regular expression to be generated and used to search the performance metric data and return the results. In some embodiments, these predefined searches are templates which have variables that can be set by the user. For example, there may be a predefined search to determine if CPU utilization is between x % and y % for more than z minutes where x, y and z are variables that the user can set before the search is run.

To run a search/query, in the preferred embodiment, the software of the system displays a query expression box and two time range boxes, one for a start time and one for an end time. These start and end time boxes are calendars in the preferred embodiment, and the user simply picks the first day for which data is to be examined and picks a second day in the end time calendar which is the last day of data to be examined. He then types his query into the query expression box in the syntax of the regular expression and hits return. The software then automatically accesses the appropriate directory structures for the day or days specified by the user, accesses the appropriate files that contain the performance metric attribute values as specified in the query expression, reads those attribute values into memory and examines the data using the logic specified in the query expression.

FIG. 6 is a template for a regular expression used to explain the syntax of a typical regular expression query. The h at the beginning of the regular expression indicates that this particular query is designed to search host performance metric data. If the query was about disks or something else, something indicative of the type of resource in question would be in the place of the h.

The large left bracket indicates the beginning of the actual query expression. The @ symbol at the beginning of the query expression is a keyword. The "CPU usage" term is the name of the attribute data to be searched and it is this attribute name which causes the software to look up the correct file name which contains the performance metric data for CPU usage. The "rx" term indicates that what follows is a regular expression, and the "b" term indicates that the type of search is for band data as opposed to delta data. The [U90-U100]{5} is a regular expression that indicates the actual criteria to be used in performing the band data search, i.e., it defines which performance metric data satisfy the query and which do not. The regular expression could also be a pointer to another regular expression stored in a file. The pointer would contain a unique ID for the regular expression to be used.

The band values are computed or mapped values for internal representation of numbers which are greater than the highest number which can be Unicoded (around 1,000,000). For example, if a data transfer rate is 20 million bits per second and the metric is 20,000,000, a band value will be computed for that metric using a reduction factor of, for example 10 million so as to reduce the 20 million number to the number 2 before it is Unicoded. Any reduction factor that brings the range of a performance metric which is a high number down into the Unicode range may be used for internal representation purposes. The searches are then done on the computed band values and not the actual performance metric numbers.

Delta values are useful for analyzing performance metric data that spikes. A delta value records how much a value has changed since the previous time it was measured.

The system, in the preferred embodiment, calculates and stores both a band value and a delta value for some or all performance metrics.

Query Definition Language

Objectives

7. Be able to traverse from a set of resources to another set of related resources and so on
8. At each stage of traversal apply certain filtering criteria:
9. Configuration attributes: Matching certain value, change in value
10. Relations: Addition or deletion of a relation
11. Performance metrics: Matching certain patterns Before a detailed description of the query definition language, a description is made of a basic operation of this search method by taking an example. FIG. 12 illustrates a data example used for the description of the example. First, it is assumed that there are two kinds of resource type, vm and host, as an environment for measuring the time-series data. It is assumed that there are vm1 and vm2 as resources having a resource type classified as vm and that there is host1 as a resource having a resource type classified as host. It is assumed that the resource having the resource type of vm has two attributes of readlatency and readiop and that the resource having the resource type of host has the attribute of readlatency.

At this time, the time-series data is stored in a state in which an ID 1204 that can identify the time slice and identifiers 1205 and 1206 are used for identifying the resource types which are assigned thereto. In FIG. 12, for easy understanding, a hierarchical structure formed of time slice-resource identifiers and a plurality of pieces of time-series data are expressed in the form of one table 1207, but those pieces of time-series data do not need to form one table or do not need to have a time stamp 1208 assigned to each row thereof. Further, in the example of FIG. 12, for easy understanding, measurement data is shown in the form of numerical values, but is actually stored in an encoded form as alphanumeric characters in order to make it easier to perform the pattern matching of the time-series data. Further, it is assumed that a relationship is defined in advance between the data having resource identifiers of vm1 and vm2 and the data having a resource identifier of h1.

Figure 14:
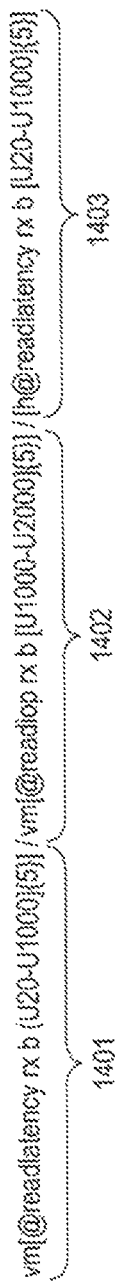
FIG. 14 is an example of syntax of searching query.

It is now assumed that a syntax as illustrated in FIG. 14 is given as a search query. The search query of FIG. 14 is one large regular expression which is comprised of three smaller regular expressions. Then, the system disclosed in the present specification interprets the syntax of the single large regular expression based on a predefined syntax rule which, using the rules of grammar of the formal language which define the syntax that must be used in all searches encoded in regular expression written using that formal language, interprets the syntax of each of the three smaller regular expressions in a predefined order, each search restricted to searching through only the data found by the previous search. In this case, the syntax of the large regular expression is divided into three smaller regular expressions having the partial syntaxes 1401, 1402, and 1403, which are evaluated in order from the beginning. So in this case, the "predefined syntax rule" is: "evaluate the three smaller regular expressions in the order in which they appear in the larger regular expression, each search restricted to searching through the matching data found in the previous search except that the first search encoded in regular expression 1401 is performed on the time sequence data in the time window defined by the user who initiated the searches." The predefined syntax rule can also define a tree-structured relationship between the searches carried out by the smaller regular expressions which comprise a larger regular expression. In such a case, the first search is called the root search and then smaller regular expressions that form the branches or leafs of the tree are simultaneously performed on the data found by the root search. So the predefined syntax rule in such a case would be: "perform the root search first, and then perform the searches of the leafs of the tree on the data found by the root search and so on in case other searches branch off from a branch of the tree." Another predefined syntax rule is "perform a search using as the search criteria a notation denoting a condition that matches a plurality of encoded values wherein a range search for a value is performable, said notation being like a wild card which can match to anything or anything within a range of values."

Figure 13:
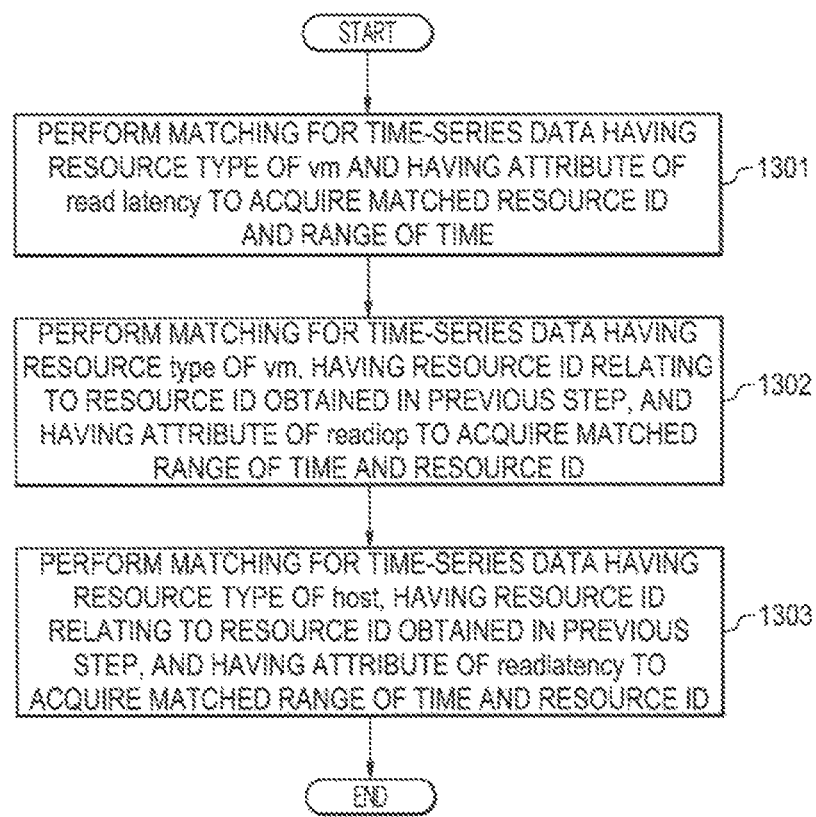
FIG. 13 is a flowchart of the processing of evaluation.

FIG. 13 illustrates a flow of a series of searches where each search is performed on the data found by the preceding search. First, a query for readlatency performance metrics in a predetermined range for resources having resource identifier vm is done, the query having the regular expression partial syntax shown at 1401 in FIG. 14 which is obtained by dividing the query into three parts separated by the related resource symbol "/", said query being represented by step 1301 in the flowchart of FIG. 13. At this time, in this query, first, the data must have the resource type of vm, which in this case, translates to the resource identifiers of vm1 and vm2. In this query, the attribute of readlatency is read, and the query is looking for performance metric values between 20 and 1000 as given by the syntax of the query shown at 1401, said performance metric values recorded in the table of FIG. 12 each being encoded by an encoding method at a time of data storage. In other words, the query established by the regular expression segment 1401 in FIG. 14 is looking for all performance metric values for readlatency for vm type resources, which, in the case of the timeslice data of FIG. 12 means resources having identifiers of vm1 and vm2, that have values between 20 and 1000. After that, a search formula based on the regular expression is created from the encoded values of 20 and 1000. At this time, if a search language supports a range search, the search formula created may be written in accordance therewith. If the search language does not support the range search, after the values between 20 and 1000 are each encoded, the matching may be performed for a character set obtained by encoding the values included in the range from 20 to 1000. Then, in accordance with the search formula based on the regular expression, the pattern matching is performed for the thus-read data to acquire matched data. In this case, the data having the resource identifiers of vm1 and vm2, the range of time, and the resource IDs of vm1 and vm2 and having readlatency performance metrics are acquired from among data included in the table of FIG. 12, the acquired data being in an area surrounded by a broken line 1201 in the table of FIG. 12. In short, the searches encoded in the regular expressions of 1401, 1402 and 1403 are performed in that order, each search restricted to searching through the matching data found in the previous search.

After that, a second, narrowing search is done using a regular expression having the partial syntax 1402, as represented by Step 1302. At this time, the search range of the data is limited to the data having the range of time obtained in Step 1301 and the search is done on the data having the resource type of vm, which in this case, translates to the resource identifier of vm1 and vm2, the search being done on data having the attribute of readiop. Processing details for the search are obtained by evaluating the partial syntax 1402 with respect to this data are applied in step 1301. As a result, the data having the resource identifier of vm2, the range of time, and the resource identifier of vm2 are acquired from among data included in an area surrounded by a broken line 1202.

Next, a query for host performance metrics for attribute readlatency is done using a regular expression having the partial syntax 1403 obtained by the dividing the query expression of FIG. 14 at the symbol/to arrive at query expression 1403, this query being represented by Step 1303 in FIG. 13. At this time, the search range of the data is limited to the data having the range of time obtained in Step 1302 among the data having the resource type of h, in this case, the resource identifier of h1, and having the attribute of readlatency. Processing details of the search are obtained by evaluating the partial syntax 1403 with respect to this data, and these process details are applied in step 1303. As a result, the data having the resource identifier of host1, the range of time, and the resource identifier of h1 are acquired from among data included in an area surrounded by a broken line 1203.

Note that, in this case, the input syntax is evaluated at a time of carrying out search processing, but such an embodiment can be applied that the syntax is converted in advance in a case of repeatedly using the same syntax, in other words, automatic reporting. In some embodiments, if the search just described is carried out often, it can be included as a search template which can be customized by the user or a "canned search" that can be invoked from a user interface that allows the user to work in the problem space isolating the user from the need to know the syntax of the regular expression.

In the present specification, such a step of narrowing down data is expressed as "traverse".

Basic Syntax Building Blocks that May be Used to Build a Query

XPath style data processing/filtering and this processing will be applied to various search queries.
<Resource Type>/<*Related resource type>[=<conf attrId>rx<regex>ORIAND . . . ][~<conf attr id>, , , ][@<perf attr id><rx bld>IrxId<regex or regex pattern id>][$<event id , , ,][+|-<related resource type>/ {Related resource type/ . . . }{Related resource type/ . . . }
Relation traversal:
<resource type>/<related resource type>/ . . .
Ex: v/h/d
The above expression will result the following path:
v→h→d
Multiple traversal paths:
<resource type>/{related resource type>/ . . . }{another related type>/ . . . }

Figure 15:
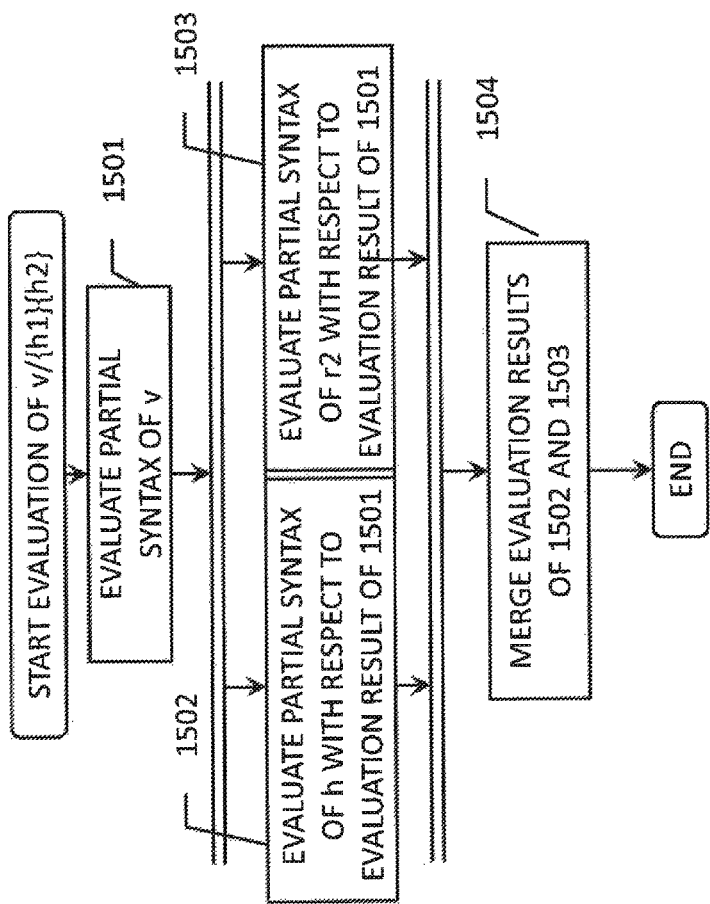
FIG. 15 is a flowchart of the processing.

The flow of the processing using this multiple traversal paths syntax rule is described with reference to FIG. 15. In FIG. 15, v, h1, and h2 each represent a query represented by a partial syntax. First, the query represented by the partial syntax of v is evaluated (Step 1501). After that, the queries represented by the partial syntaxes of h1 and h2 are each applied to the evaluation result of (found data) from the query represented by partial syntax v and evaluated with respect thereto (Steps 1502 and 1503). After that, the obtained results are merged (Step 1504).

Example 2

Ex: v/{h/n}{r/d}

A description is made of the flow of the processing performed in a case of the above-mentioned sample where v, h, n, r and d all represent queries expressed as regular expressions which are part of the syntax of the overall query having syntax v/{h/n}{r/d}. First, v is evaluated, and then h and r are each applied to the evaluation result of v. After that, n and d are respectively applied to the results of applying h and r. Finally, as the flow of the processing, the following two paths are executed to obtain a processing result by merging the two results.
•v/h/n (v→h→n)
•v/r/d (v→r→d)

Another Example

Note: There is no limit on number of queries or number of sub paths and any number of levels of nested paths are supported as shown in the following sample:
Ex: v/{h/{r1/d1}{n}}{r2/d2}

A description is made of the flow of the processing performed in a case of the above-mentioned sample. First, v is evaluated, and then h and r2 are each applied to the evaluation result of v. To the result of applying r2, d2 is applied. On the other hand, r1 and n are each applied to the result of applying h, and d1 is further applied to the result of applying r1. Finally, the following three paths are executed to obtain a processing result by merging the three results.
•v/h/r1/d1
•v/h/n
•v/r2/d2
Look for Changes in Configuration:
<resource type>[~<attr id>, <attr id>, , ,]
Ex: v/h[~attr1,attr2]/n
It takes all resources of type 'v', finds the related resources of type 'h' which have configuration attributes attr1 and attr2 which have changes in the given time window. Then it finds resources of type 'n' the resulting resources of type 'h'.
Find Patterns in Performance Data:
<resource type>[@*<attr id><rx bld>IrxId<expression or id>][@ . . . ]
<resource type>[@*#tw1#<attr Id>rx bld<expr . . . >]/<r type>[@^tw1 ^<attr id><rx bl d> . . . ]
<resource type>[@*#tw1#<attr Id>rx bld<expr . . . >]/<r type>[@#tw2#^tw1^<attr id><rx bld> . . . ]
Where
*: ignores the resulted data 1) can be used to derive time windows for subsequent use 2) can be used to build logical pattern
b: for banded datad: for delta values
Special note: Any numeric value in actual regex (exclusion=>quantifiers) should be prefixed with "U" e.g [40-90] {5} will become [U40-U90] {5}. Here numbers within the character class have been modified but not the quantifier i.e {5}.

Examples of Regular Expression Queries of Various Types

Examples

•v[@attr1 rx b U90+]/h

A query having this syntax finds all the virtual machines which have performance data of metric attr1 value that equals or exceeds 90 in the given time window. Then it finds the respective hosts. It also returns the matched performance data

•v[@attr1 rxId rxp1]/h

This query is similar to the example just preceding, but it specifies the regex pattern id which will be defined in a separate file.

Reuse of processing result:

•rt1 [@#tw#attr1 attrCond1]/rt2[@^tw^ attr2 attrCond2]

Figure 16:
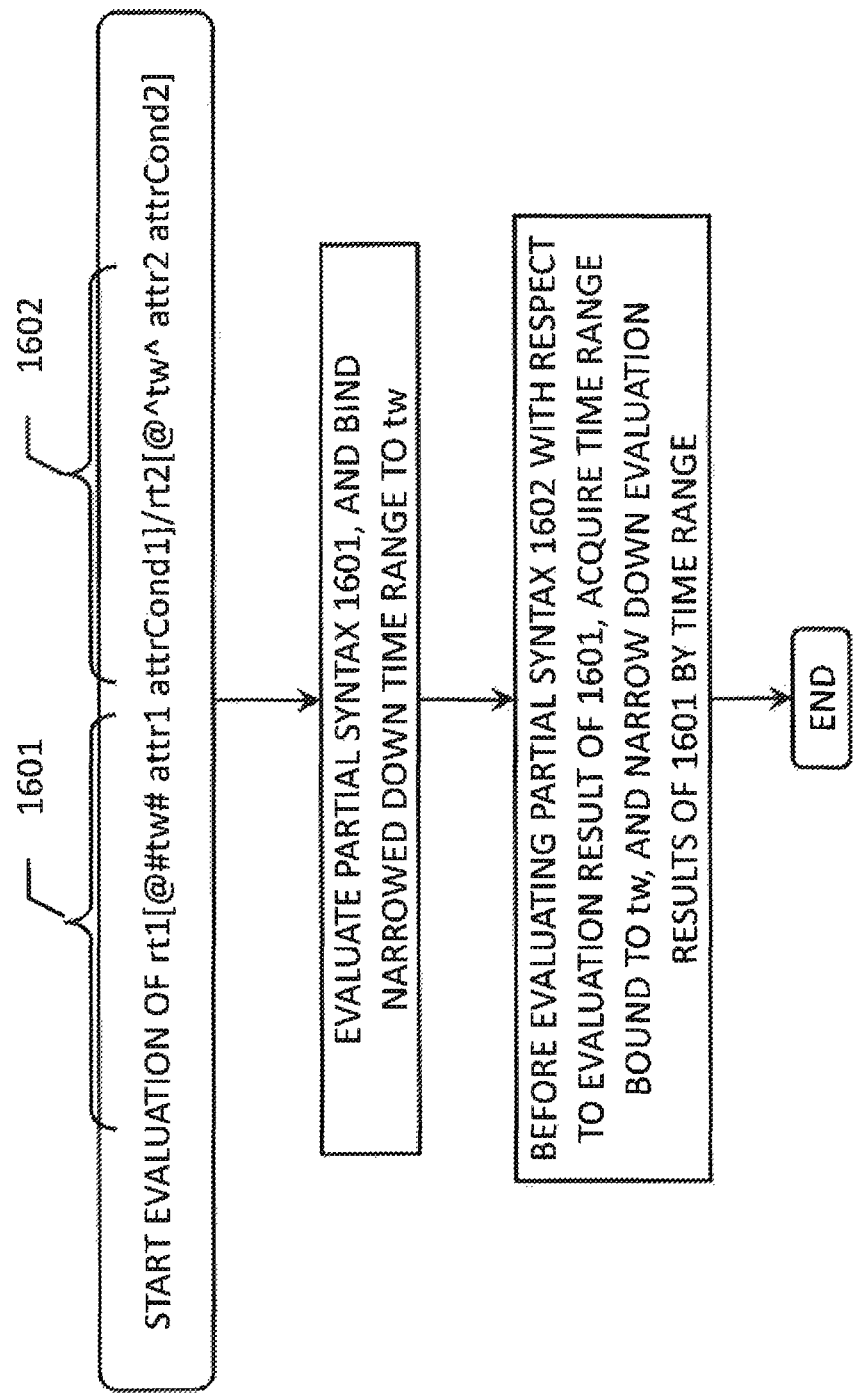
FIG. 16 is a flowchart of the processing.

FIG. 16 illustrates the flow of the processing performed at this time. First, the evaluation result of the query represented by the partial syntax of rt1[attr1 attrCond1] is bound to tw. After that, the query represented by the partial syntax of rt2[attr2 attrCond2] is evaluated, and the range of data processed at that time is a time range bound to tw.

Example

•v[@#tw1#attr1 rx b U90+]/h[@^tw1^ attr2 rx b U80+]

The first metric has defined a time span Id (tw1) which can be referred by any other metric in the subsequent path. If metric attr1 has generated any matched data, the respective time windows will be assigned the id "tw1" and the same time windows will be used on metric attr2 [attr12 or attr2?]. Note that if the connected host has more narrow time windows than the resulted tw1, the common slots will be used on metric attr2.

Event Filter:

Syntax: [$*t:<regex pattern>,d:<regex pattern>]

Where

*: ignores the resulted data (won't produce any output but can be used to build logical patterns) t: will search against the type of the eventd: will search against the description of the event The following are valid:

| | |
|---|---|
| C) [$t:rmAdded] | // type check |
| D) [$d:error] | // description check |
| E) [$t:rmAdded,d:error] | // logical OR |
| F) [$*t:rmAdded] | // type check and ignore the result |
| G) [$*d:error] | // description check and ignore the result |
| H) [$*t:rmAdded,d:error] | // logical OR and ignore the result |

Resource Addition/Deletion:

<resource type>[+<related resource types added> , , , ][−<related resource types removed>, , , ]

Ex: v[+h,d,n][−h,d]

The above expression will return resources of type 'v' on which relation of type 'h', 'd', 'n' has added or relation of type 'h', 'd' has been removed.

How to exclude the data of a matched relation:

<resource type>/*<related resource>/<sub resource>

Ex: v/*h/d

The above express will return resources of type 'v' and the related resources of type 'd' directly. But, it will skip the data of the matched resources of type 'h' in the output.

Note: One can mix any of the above combinations. One can specify configuration changes, performance data filters, events list, multiple paths, etc. in the same query.

Logical AND Operator

Logical AND operations are supported at path level and filter level. Applicable conditions for processing can be narrowed down by using logical AND operators.

At path level:

Syntax: P1/[&]P2/[&]P3/P4 . . .

Figure 17:
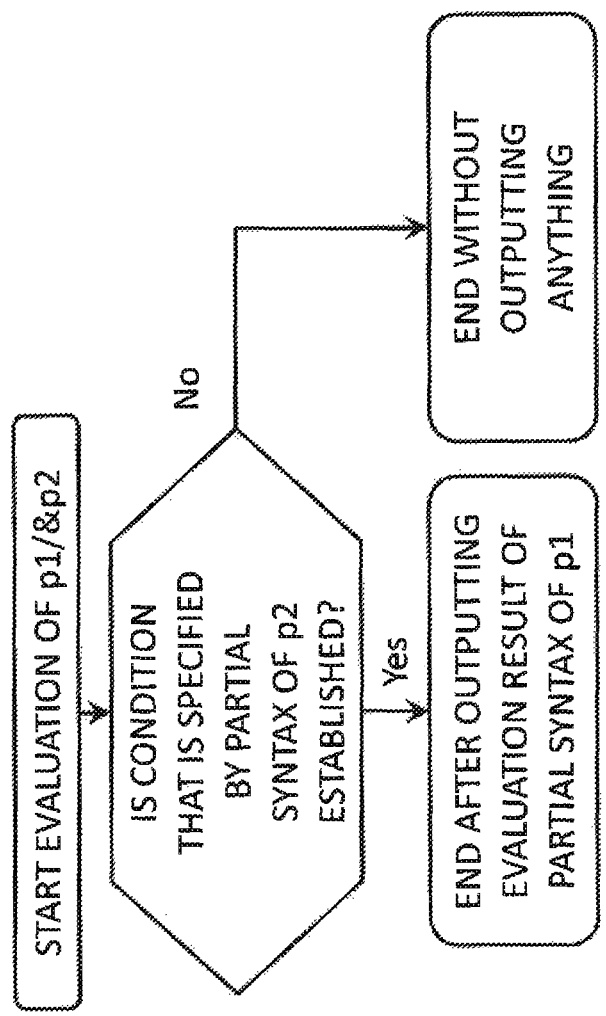
FIG. 17 is a flowchart of the processing.

A description is made of the flow of the processing performed in a case of using the logical AND operator at the path level. First, FIG. 17 illustrates a basic flow of a process using the AND operator. Here, in FIGS. 17, 18, and 19, p1, p2, and p3 each represent a query partial syntax. By describing p1/&p2, the processing is executed as illustrated in FIG. 17, and p1 is evaluated only when a condition specified by the query having partial syntax of p2 is established.

Example 1 p1/&p2 p1&&p2 Note: p1 qualifies only if p2 qualifies

Figure 18:
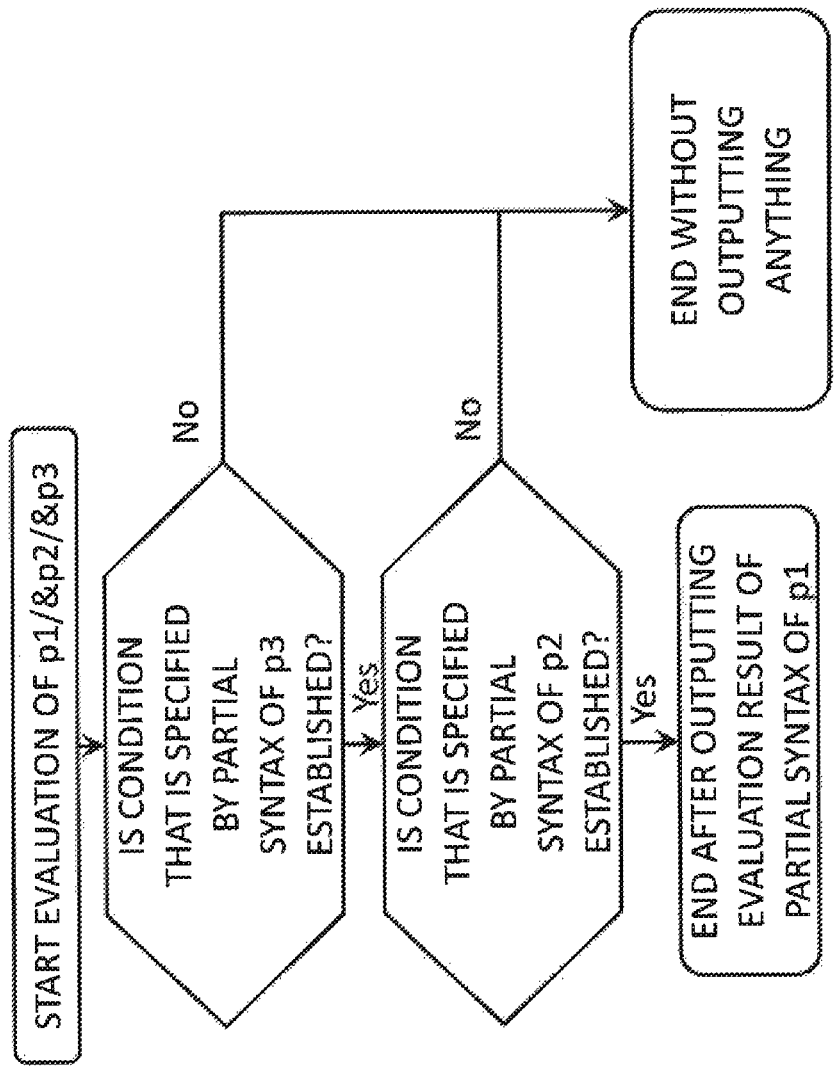
FIG. 18 is a flowchart of the processing.

Further, this operator can be used a plurality of times. FIG. 18 illustrates the flow of the processing performed in that case.

Example 2 p1/&p2/&p3 p1&&p2&&p3 Note: p2 is dependent on p3 and p1 is dependent on p2

Figure 19:
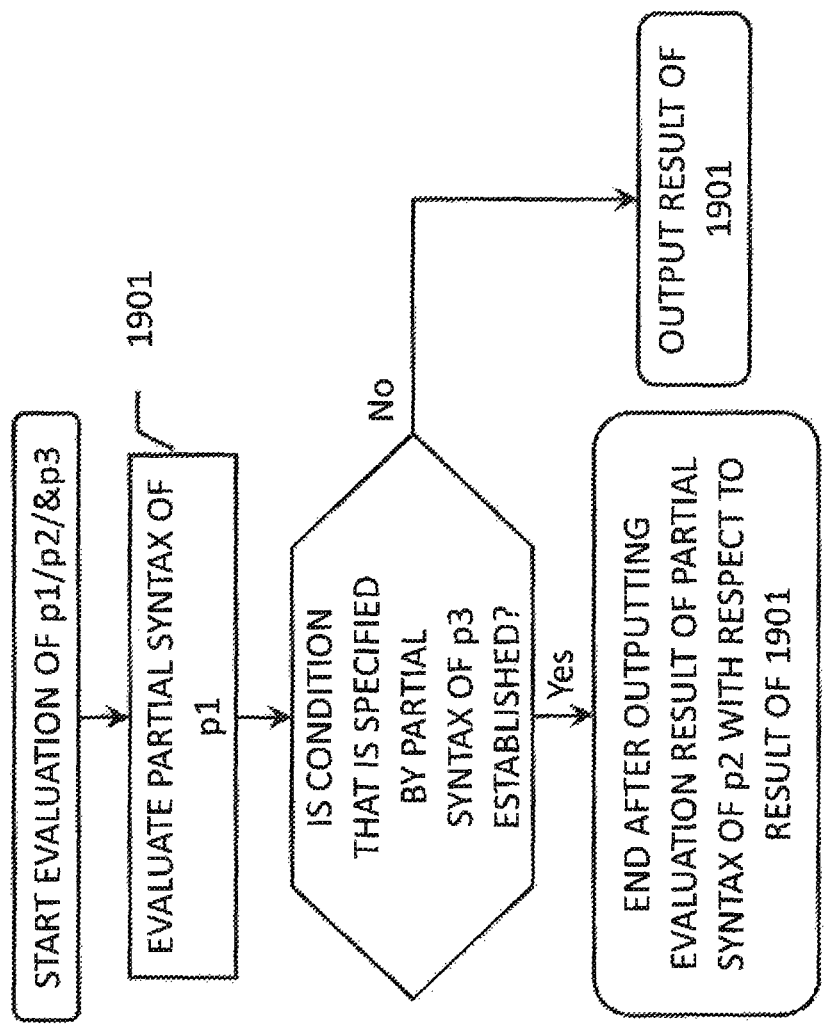
FIG. 19 is a flowchart of the processing.

Only the partial syntax immediately before the logical AND operator is determined as to whether or not to be executed by the operator, and the partial syntax before the above-mentioned partial syntax is evaluated without conditions. FIG. 19 illustrates the flow of the processing performed in that case.

Example 3 p1/p2/&p3 p1,p2&&p3 Note: p1 can qualify irrespective of p2 status but p2 can qualify only if p3 qualifies

Example 4 p1/&p2/p3/&p4 p1&&p2,p3&&p4 Note: p2 can qualify irrespective of p3 status.

At Filter Level:

Syntax: P1 [filter1][&][filter 2][&][filter 3]/P2[filter 1][&][filter 2] . . .

Figure 20:
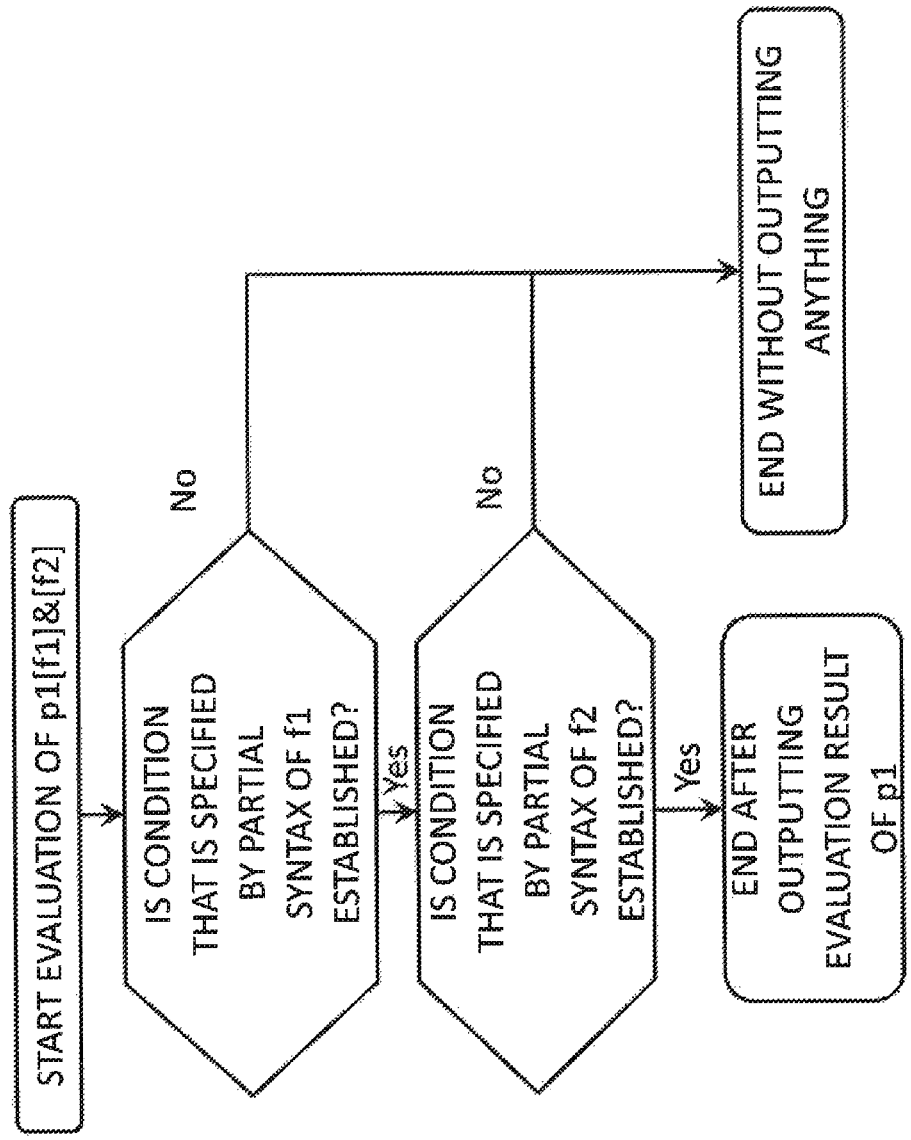
FIG. 20 is a flowchart of the processing.

A description is made of the flow of the processing performed in a case of using the logical AND operator at the filter level. First, FIG. 20 illustrates a basic flow. Here, in FIGS. 20 and 21, p1 is the partial syntax representing the processing, and f1, f2, and f3 represent filter processing for filtering data supplied to the processing of p1. By describing p1[f1]&[f2], the processing is executed as illustrated in FIG. 20, and the data that satisfies both conditions of f1 and f2 can be specified as the data to which p1 is to be applied.

Example 1 p1 [=1001 rx Demo3]&[@2001 rx b U10+] Note: P1 qualifies only if both the filters find matches.

Figure 21:
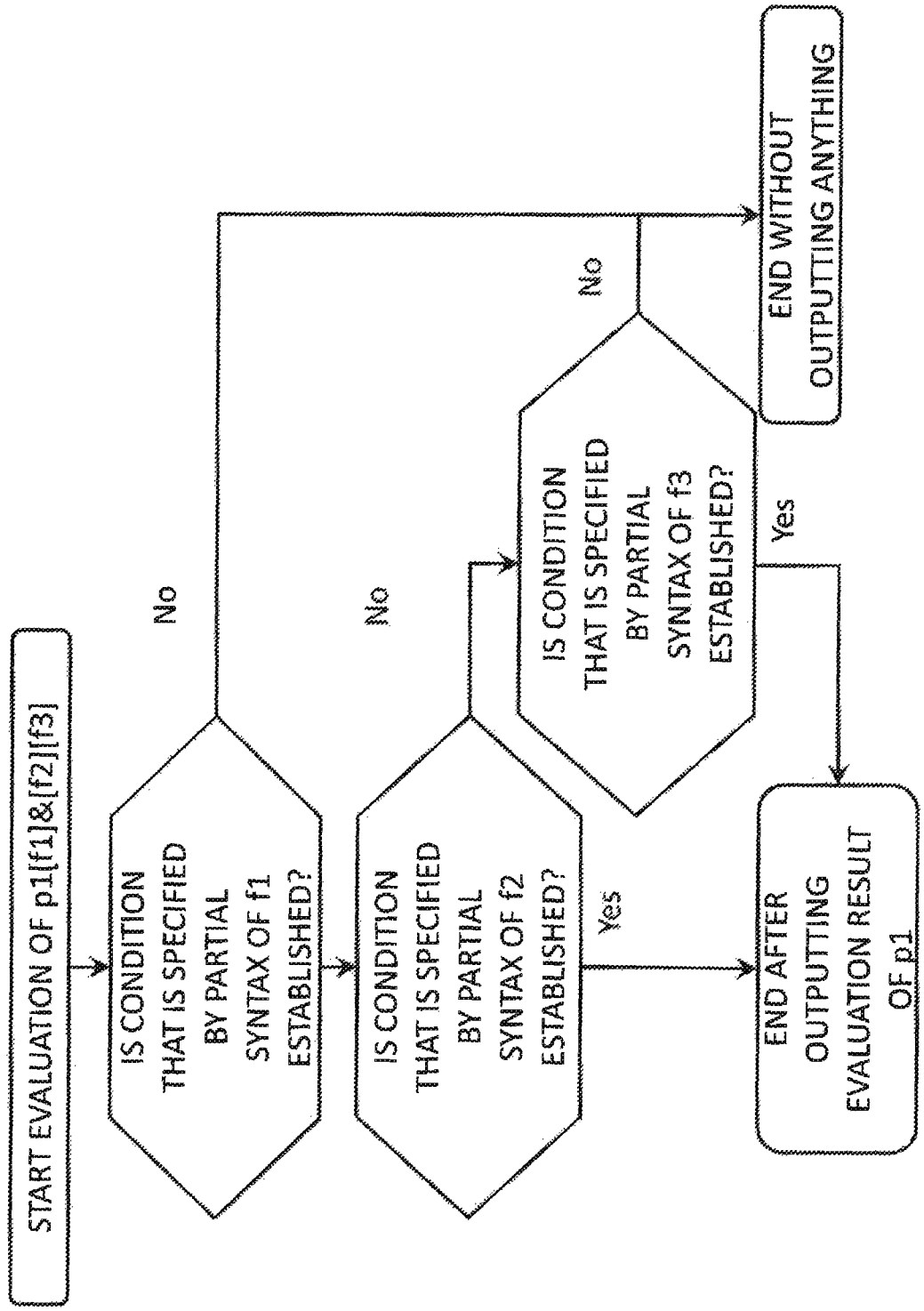
FIG. 21 is a flowchart of the processing.

A case where the partial syntaxes that specify the filter processing are simply arrayed is recognized as OR, which is applied prior to the AND operation. FIG. 21 illustrates the flow of the processing performed in that case.

Example 2 p[f1][f2]&[f3] (f1||f2)&&f3

Example 3 p[f1]&[f2] [&f3] f1&&f2&&f3

Example 4 p[f1][f2][f3] f1||f2||f3

Example 5 p[f1]&[f2][f3] f1&&(f2||f3)
Note: if f1 fails, it exits (no processing of f2 or f3). Short circuit execution on Logical 20 AND failure.

Example 6 p[f1]&&&&[f2] f1&&f2 Note: multiple &s will be collapsed into one

Example 7 p[f1][f2]& f1 || f2 Note: trailing & will be ignored

Others

Regular expression patterns can include brackets, but only with matching pairs. When a resource is included in the higher level path, it will not be repeated in lower level paths.

Example v[=attr1 rx Demo3]/*h/v

In third level in the result, Demo3 will not be repeated.
v[=attr1 rx Demo3]/h/v
Regex Patterns
Query supports both regular expression string or regular expression pattern id which will be defined in a separate file in the following format:

| <PatternList> <Pattern id=" " extraDataPoints=""><![CDATA[<pattern>]]></Pattern></PatternList> |
|---|

Example

| <PatternList> <Pattern id="rxp1" extraDataPoints="30"> <![CDATA[9+]]> </Pattern></PatternList> |
|---|

Pattern with id "rxp2" will directly apply the regular expression pattern to the performance data.
ExtraDataPoints will be used in the result set to return additional data in addition to the matched values. It adds 30 points before and after to the matched values.
Query Processing Flow The configuration data tells the system what types of resources have performance metric data stored in the system and what are the attributes of each type of resource, some of which may have had performance data measured. The configuration data basically tells what resources have existed for what periods of time.

FIG. 7 is a flowchart of the processing of the query processor. When the query processor starts, it first reads the query to determine the start and end times of the interval of performance data to be searched, and then reads a configuration data file to determine for the time frame of the query (as set by the user by setting the start date and end date for the query expression) what resources exist or have existed. These processes are represented by step 210. If a resource or resources existed for only part of the relevant query interval, the query processor determines from the configuration data the valid times these resources existed during the relevant interval, and, if the resources still exist, at what time they came into existence during the relevant query interval. Resources can come and go such as when a server is taken offline or a disk is swapped out. Reading the query and the configuration data file and determining what resources existed at any time during the relevant interval is symbolized by step 210. The configuration file also contains data which tells which resources are related to the resources named in the query. For example, a disk which is contained in or connected to a particular server is indicated as related to that server.

The server reads all this data in the configuration file and, in step 212, creates a map of only the relevant resources, i.e., the resources of the system that match the resource type identified at 208 in the query of FIG. 6 and which existed at any time during the query interval and any related resources. In the preferred embodiment, the string at 208 identifies only a resource type. In this example of FIG. 6, the resource type is a host. Step 214 represents the process of loading the entire day of performance metric data for the relevant day, relevant resources (named resource and related resources) and the relevant attribute (the attribute named in the query). This results in all the performance data for all resources of that type being loaded into memory as described below for the entire day or days which include the relevant interval starting at the start time and ending at the end time identified in query. These start and end times are given by the user in separate boxes (not shown) from the query expression box when the user enters the query expression of FIG. 6 by interacting with a display on a computer that shows the query box and start and end time boxes.

This filtering out of performance data for resources not of the named type allows the query processor to easily and quickly find performance metric data which has been stored in the NRDB for only the relevant resource types indicated at 208 in the query syntax of FIG. 6.

The query processor then starts parsing the query expression and determines from element 213 of the query of FIG. 6 what type of attribute data for the resource type named at 208 which is stored in the NRDB and which the query processor needs to perform the query. In the example of the query of FIG. 6, parsing the query and reading portion 213 thereof, the query processor determines it will be performing a search on performance metric data for CPU usage on all hosts as identified by the string at 208. This is symbolized by step 214 of FIG. 7.

Also in step 214, the query processor examines the start time (date and time) and end time (date and time) set by the user on the query screen (not shown). The query processor then goes to the NRDB and examines the directory structures and finds the directory structures for the relevant day or days that contain the start time and end time of the query. The query processor then determines which subdirectory or subdirectories in these relevant directories contain performance metric data for resources of the type indicated at 208 in FIG. 6. The query processor then determines the text files in the relevant subdirectories and determines which text files contain the performance metric data for the group of attributes which contain the attribute identified in the query expression, i.e., the attribute identified at 213. The query processor also determines from the configuration data file what other resources are related to the resource types identified at 208 and loads the performance metric data for these related resources for the relevant interval into memory also, which is also part of step 214 in some embodiments.

Next, in step 216, the query processor determines whether the needed data is already stored in cache. If so, the needed data is loaded from the cache memory to save the time of a disk read. If the needed data is not stored in the cache, the query processor sends a read request to the operating system API to read the appropriate text file or files containing the data needed for the query into memory in step 218. Step 218 loads the entire day's worth of performance data for the resources of the type identified in the string at 208 in FIG. 6 and for the group of attributes including the attribute identified at 213 of the query expression.

Now all the performance metric data for the file containing the performance metric data for the entire group of attributes that contain the relevant attribute, and for the entire day or days spanning the start date and end date are stored in memory. The data in memory contains both performance metric data for attributes not named in the query as well as performance metric data for the relevant attribute which is outside the start time and end time given in the query. To eliminate this excess data, the query process builds a new string containing only the data for the relevant attribute and only starting at the starting time and ending at the ending time named in the query. This process is symbolized by step 220. To do this, the query processor finds the row in the loaded file which contains the performance metric data for the relevant attribute identified at 213 of the relevant resource identified at 208 and counts entries until it reaches the value recorded for the named start time. That performance metric value and all subsequent values extending out to the end time are copied to a new file in the same sequence they were stored in the NRDB, all as symbolized by step 220.

In step 222, the logic of the regular expression shown at 221 is applied to the performance data in the new file created in step 220 to find values which meet the criteria expressed in the regular expression at 221 of the search query for every resource of the type identified at step 208. The values so found are returned and decoded from Unicode back to the original performance metric values received from the probe. If multiple substrings from multiple resources of the type indicated at 208 are found which match the query, all such matching substrings are returned along with identifying data as to which resource returned each string. In some embodiments including the preferred embodiment, the metadata about the resource identity (the specific host identity in the example of FIG. 6), the attribute identity (CPU usage in the example of FIG. 6), as well as the start time and end time of the query and the times the returned values were recorded is also returned for help in analyzing the results. In some embodiments, only a true or false result is returned. In some embodiments, if a true result is returned, and the sub string of performance metric values which matched the regular expression is also returned after being decoded from Unicode back to the performance metric value received from the probe[7] end time of the query and the times the returned values were recorded is also returned for help in analyzing the results. In some embodiments, only a true or false result is returned. In some embodiments, if a true result is returned, and the sub string of performance metric values which matched the regular expression is also returned after being decoded from Unicode back to the performance metric value received from the probe.

Nested Queries

Sometimes complex situations arise where trouble shooting of the performance metric data is needed to solve a problem. An example would be where a host is running multiple virtual machines and one of them has slowed down considerably or stopped responding and the reason why needs to be determined. In such a case, a set of nested queries such as those given below can be used to determine the source of the problem.

vm[@readlatency rx b [U20-U1000] {5}/h[@readlatency rx b [U20-U1000]{5}/vm[@readiop rx b [U1000-U2000]{5}]

The above query is actually three nested queries designed to drill down into the performance data to find out what the problem is with a slow virtual machine.

The first part of the query is: vm[@readlatency rx b [U20-U1000]{5}/This query looks at the readlatency attribute (a measure of speed) of all virtual machines which is between U20 and U1000 for 5 consecutive readings. This range U20-U1000 finds all the virtual machines which are running pretty slow.

The question then becomes why are these virtual machines running slowly. To find that out, one question would be are the hosts that are executing the code of the virtual machines themselves running slowly for some reason. In parsing this query, the query processor determines all host type resources which are related to the virtual machine type identified by the string vm at the beginning of the query. The performance metric data for all these hosts is loaded into memory when the virtual machine performance metric data is loaded into memory according to the processing of FIG. 7. In order to find out if the host or hosts are running slowly, the second part of the query is used. That part is:

h[@readlatency rx b [U20-U1000]{5}/

This second part of the query looks at all the readlatency performance metric values for host type resources that are related to the virtual machine resource type identified in the first part of the query and determines which ones of these hosts are running slowly. The returned data indicates which hosts have slow read latency. The question then becomes why is this host or hosts running slowly. To answer that, the third part of the query is used. That part determines which virtual machines which are related to the hosts have high 10 operations going on which are bogging down the hosts. The third part of the query is:

vm[@readiop rx b [V1000-V2000]{5}]

This query returns the identities of the virtual machine which have high levels of input/output operations going on. This high level of I/O operation will bog down the hardware of the host and will be the explanation why other virtual machines have slowed down or stopped. The results can then be used to shut down the virtual machine that is bogging down the system or modify its operations somehow so as to not slow down the other virtual machines.

The results returned, for example, might indicate that virtual machine 1 on host 1 is running slowly and host 1 is running slowly because virtual machine 3 on that host is running a high number of I/O operations. Another set of data that matches the three queries may show also that virtual machine 2 running on host 2 is running slowly because host 2 is running slowly because virtual machine 4 running on host 2 is carrying out a high number of I/O operations.

Module Processing Flows

Figure 8A:
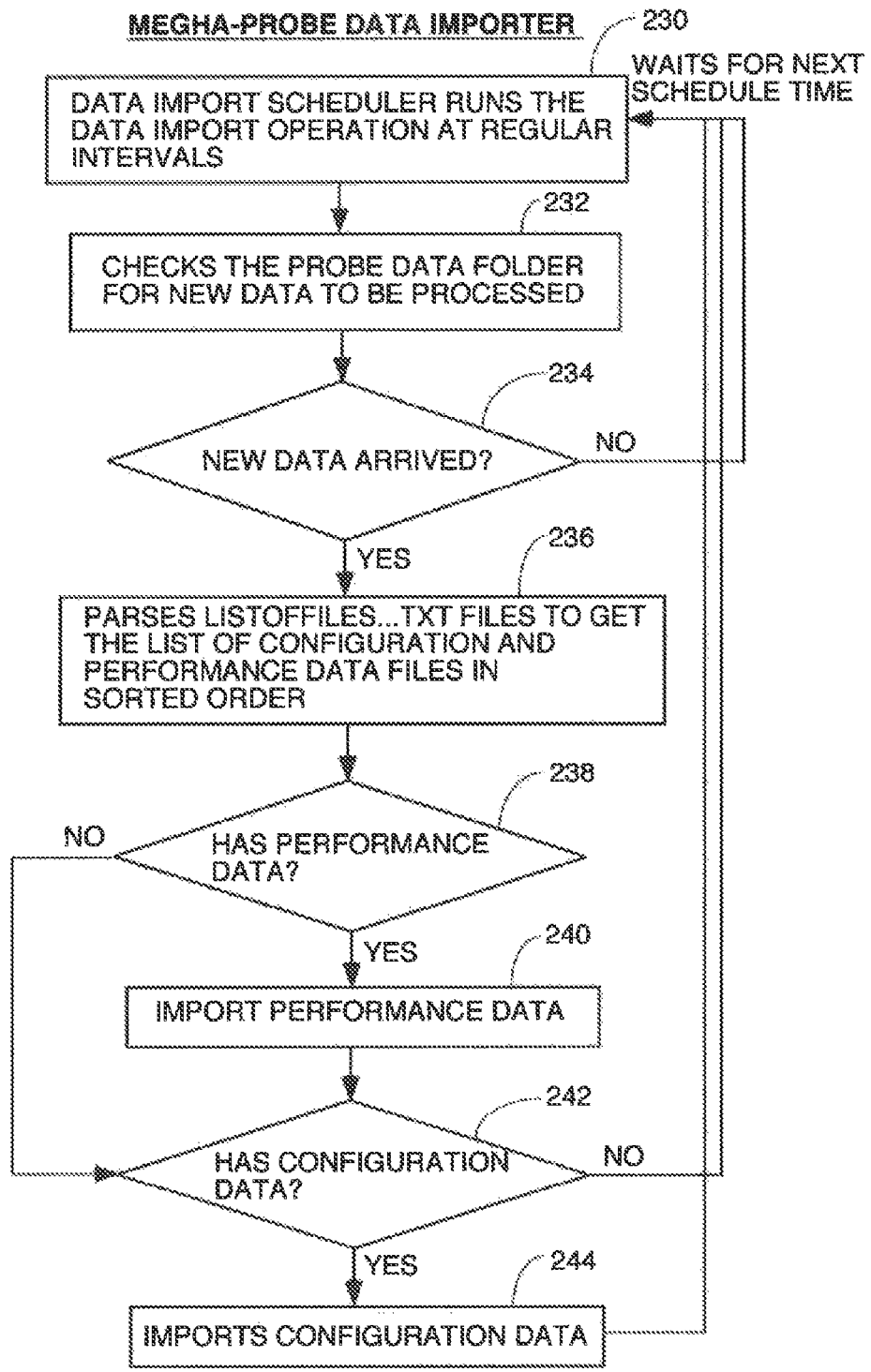
FIG. 8, comprised of FIGS. 8A through 8C, is a flowchart of the processing of the probe data importer.
Figure 8B:
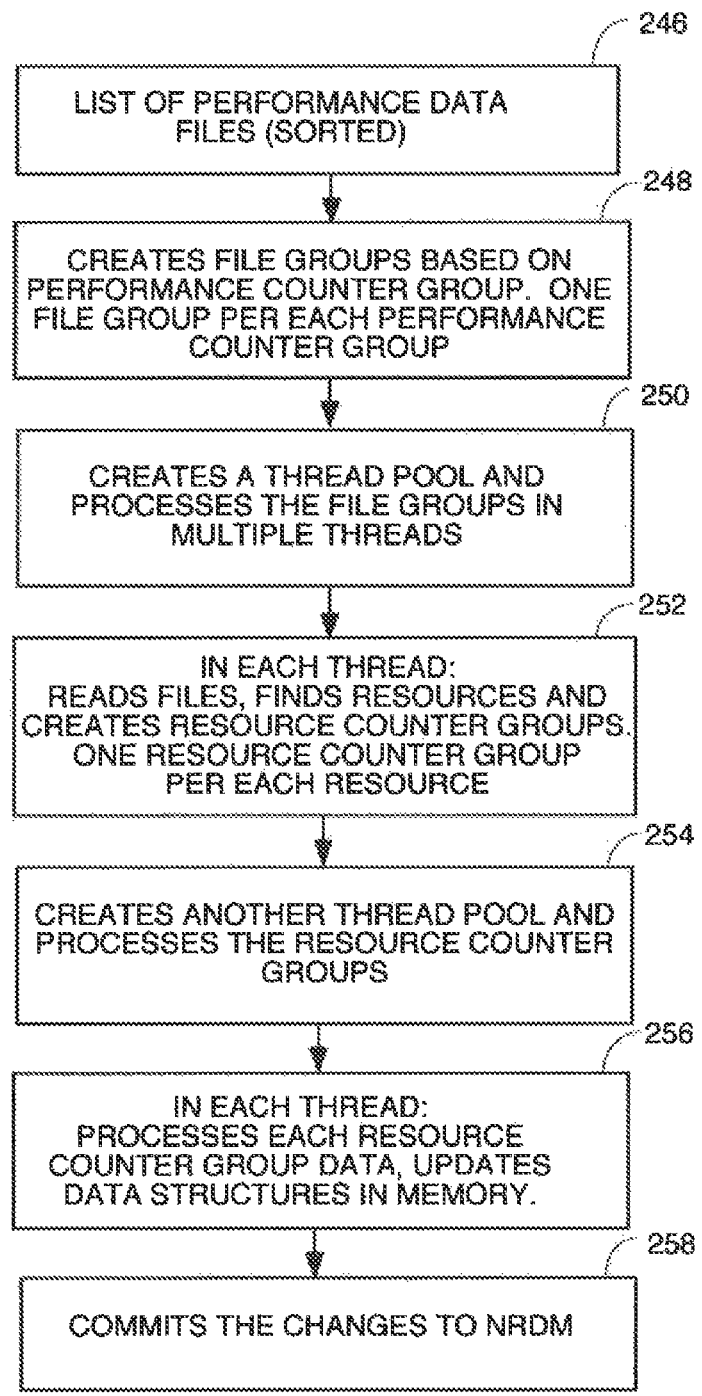
Figure 8C:
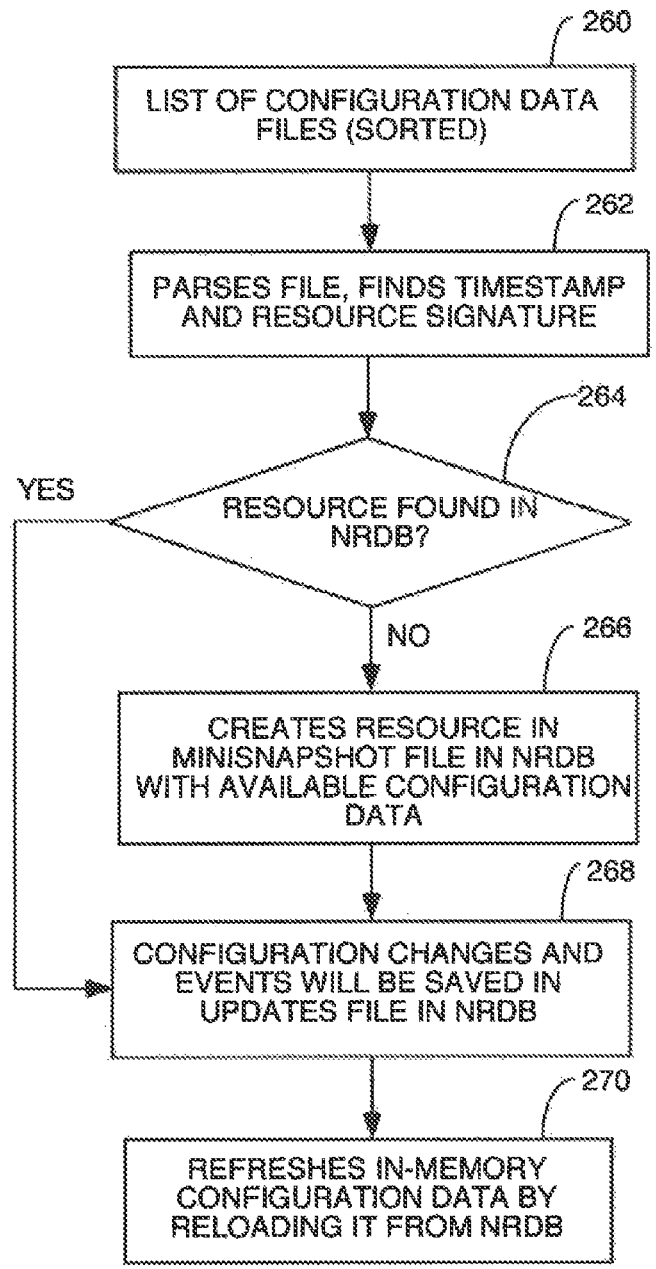

FIG. 8, comprised of FIGS. 8A through 8C, is a flowchart of the processing of the probe data importer. The Probe Data Importer runs a Data Import Scheduler routine which runs data import operations at regular intervals, as symbolized by step 230. Step 232 checks the probe data folder for new data to be processed. Test 234 determines if new data has arrived, and, if not, processing returns to step 230. If new data has arrived, step 236 is performed to parse the list of files to get the list of configuration and performance metric data files in the new data in sorted order. Test 238 determines if the new data has performance metric data in it. If so, step 240 is performed to import the performance data. If the new data does not have performance data files in it, processing skips from step 238 to step 242 where a test is performed to determine if configuration data has arrived. If not, processing returns to step 230 to wait for the next data import. If new configuration data has arrived, step 244 is performed to import the new configuration data.

Step 246 starts the processing of performance metric data files listed in the sorted list. Related performance counters of each resource will be grouped together for storage and access optimization. Step 248 creates file groups based on performance counter group wherein one file group is formed for each performance counter group. Step 250 creates a new thread pool and processes the file groups in multiple threads. Using Java API (java.util.concurrent package), it creates a pool of threads and each thread will pick one FileGroup at a time and processes it. After completion of one FileGroup processing, the same thread will pick the next FileGroup, if any, for processing and the process repeats until all the FileGroups are processed. Total thread count in the thread pool is configured through application properties file. Step 252 is the processing for each thread. In each thread, the files are read and the resources identified in the files are found and resource counter groups are created. There is one resource counter group per each resource. In step 254, another thread pool is formed, and the resource counter groups are processed as explained above. In step 256, for each thread, the resource counter group data is processed, and data structures in memory are updated to reflect the collected performance metric data for each resource. The resource counters are used to determine where in each text file each performance metric data value is to be stored to properly reflect the time at which it was gathered. Finally, in step 258, the data structures created in memory, i.e., the text files created when the performance metric values are converted to Unicode and stored in text files per the structure described elsewhere herein, are written to non volatile storage of the NRDB.

Step 260 on FIG. 8C represents the start of processing of the configuration files listed on the sorted list. In step 262, the configuration data file is parsed and the timestamp and resource signature is found. Test 264 determines whether the resource identified by the resource signature is found in the NRDB. If not, step 266 creates a minisnapshot file in the NRDB using the available configuration data. If test 264 determines that the resource identified in the configuration file is already in the NRDB, step 268 is jumped to where the configuration changes and events are saved in an updates file in the NRDB. Finally, in step 270, the in-memory configuration data is refreshed by re-loading it from the NRDB.

Figure 9A:
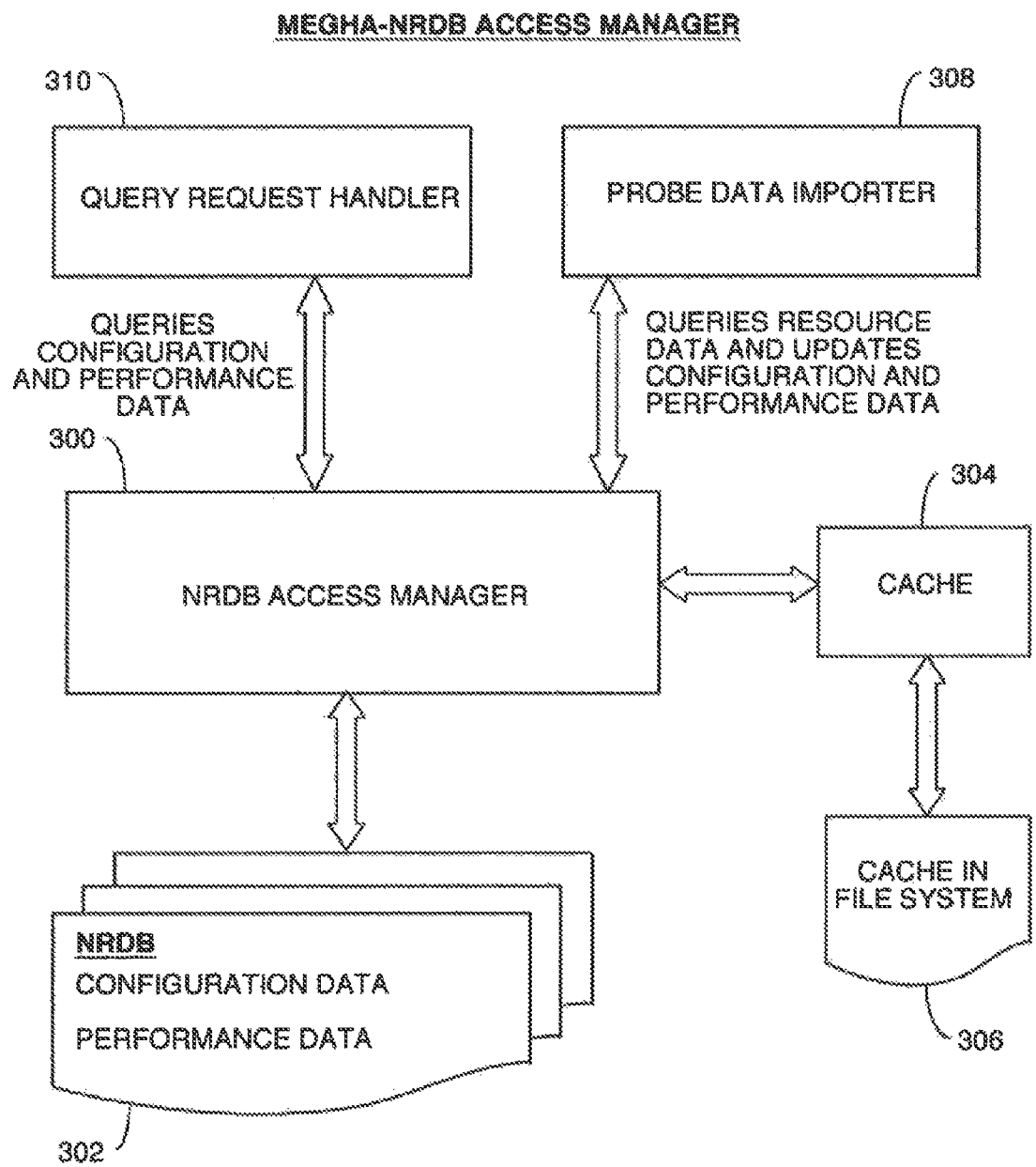
FIG. 9, comprised of FIGS. 9A and 9B, is a diagram of the modules in the system and a flowchart of the processing of the NRDB Access manager module.
Figure 9B:
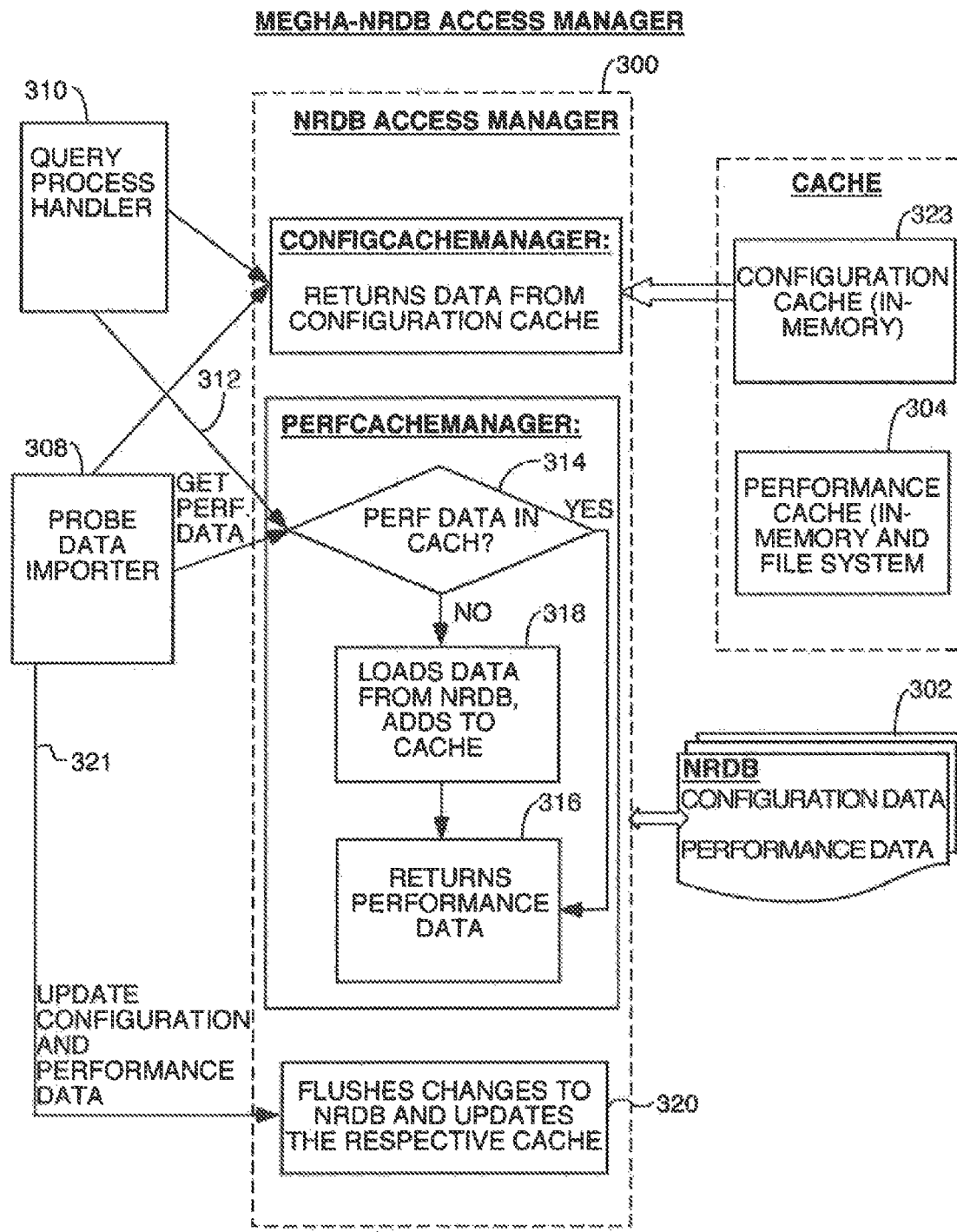

FIG. 9, comprised of FIGS. 9A and 9B, is a module diagram and flowchart of the processing of the NRDB Access manager module. The NRDB access manager module 300 controls access to the non relational data base file system 302 where the configuration data and performance metric data is stored. The NRDB access manager module 300 retrieves data from the NRDB and uses a cache 304 in memory of the server which is running module 300 and a cache 306 in the file system to store data which is frequently accessed to speed up data access. Performance data and configuration data are imported from the probes by the Probe Data Importer module 308 by the processing previously described and put into the NRDB via the NRDB access manage module 300. Query requests to analyze the performance metric data in the NRDB are handled by Query Request Handler module 310 which accesses the data in the NRDB via the NRDB Access Manager module 300.

In FIG. 9B, the NRDB Access Manager processing starts with receiving a request for performance metric data from the Query Process Handler, this request symbolized by line 312. Step 314 determines if the requested performance data is in the performance data cache 304 in the system RAM and in the file system. If it is, step 316 is jumped to, and the performance data is returned from the cache to the Query Process Handler 310. If test 314 determines the performance data requested is not in the cache, step 318 is performed to load the requested data from the NRDB file system into the cache 304, and then step 316 returns the requested data to the Query Process Handler 310.

The Probe Data Importer 308 adds updated and new configuration data and new performance data via data path 321 to the NRDB through step 320, and updates the respective configuration data cache 323 in RAM or the performance data cache 304 in RAM and in the NRDB file system itself. NRDB Access Manager before processing performance metric data gets the in-memory representation (Java object) of the performance metric data through Performance cache. Performance cache first verifies in memory whether it is already loaded from the file. If not, it loads the data from the file for the given date. If data is not available, it creates a file with template data (default values) for all the sampling intervals for that day. Based on the start time, it updates the in-memory performance metric data at appropriate locations. Once all the metrics data in the group is processed, it commits the changes back to the file. The data will be compressed (deflate format) before saved into the file.

Figure 10:
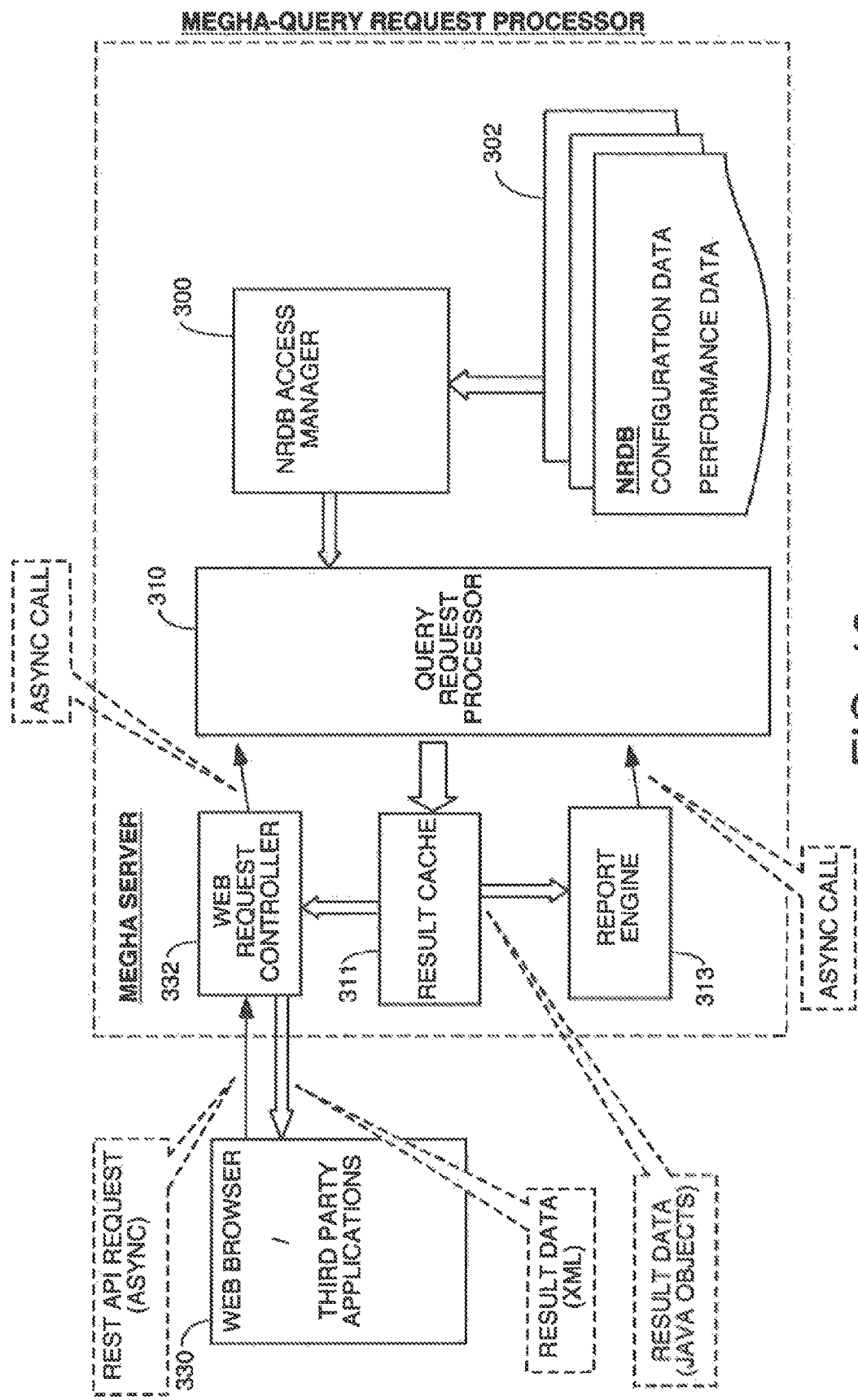
FIG. 10 is a block diagram of one embodiment of the overall system including the major functional modules in the central server called Megha, where the query request processing for analysis of performance metric data occurs and where the NRDB stores the performance metric data and configuration data.

FIG. 10 is a block diagram of one embodiment of the overall system including the major functional modules in the central server called Megha™, where the query request processing for analysis of performance metric data occurs and where the NRDB stores the performance metric data and configuration data. Persons who want to query the performance metric data send an asynchronous request using a web browser running on a client computer 330 to a Web Request Controller 332 running on the Megha server using a REST application programmatic interface (API). The Web Request Controller 332 receives the request, validates it and then forwards it to the Query Request Processor module 310 with an asynchronous Java API call. Then the Web Request Controller returns the status to the client computer 330 by hinting that the client needs to come back for the result. The Query Request Processor 310 processes the request and incrementally saves the results in a Results Cache 311. The client computer 330 then sends back a request for the results to the Web Request Controller 332 which checks the Results Cache 311. The results are then returned by the Web Request Controller 332 to the client 330 in an XML format if available. If the Query Request Processor is still processing the request, the Web Request Controller send the status hint to the client indicating it needs to send another request for the results later. The Report Engine 313 is a Java class object which sends query requests to the Query Request Processor 310 using Java API invocation asynchronously and reads the results data from the Result Cache 311 through a Java API.

Figure 11:
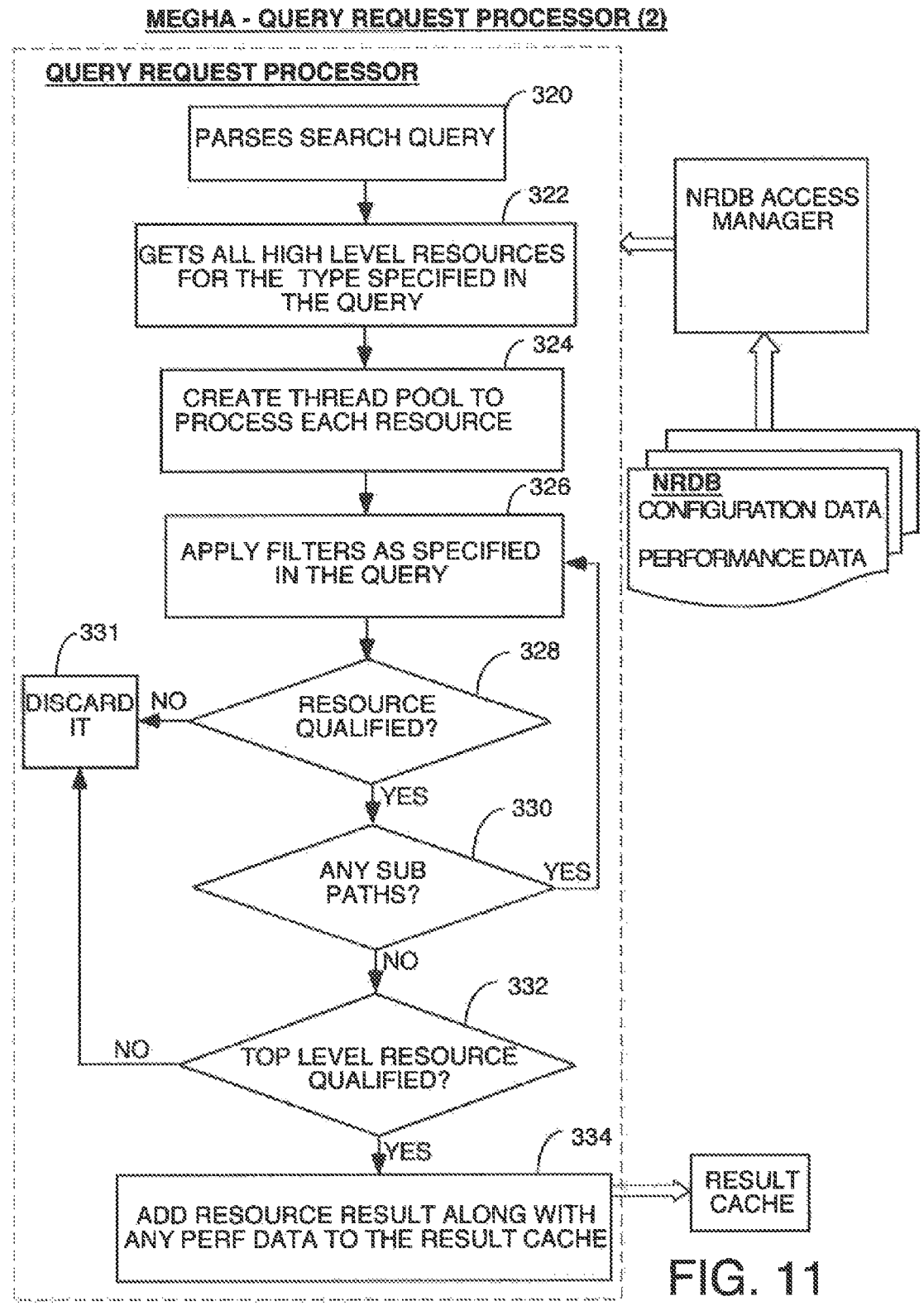
FIG. 11 is a flowchart of the processing by one embodiment of the Query Request Processor.

FIG. 11 is a flowchart of the processing by one embodiment of the Query Request Processor. Step 320 parses the search query. If the search query has an invalid format, the result cache is updated with an error and processing is terminated. Each query starts with a high level resource type. The Query Request Processor reads the resource type and responds by making a request in step 322 for all the performance metric data in the NRDB for all resources of the type specified in the query. That request is made through the NRDB Access Manager. In step 324, a thread pool is created to process the data from each resource of the type identified in the query. Each thread processes data from one of the resources of the type identified in the query. The number of threads created is configured in the application properties file.

In step 326, any filters specified in the query are applied. Filters can be things like configuration attribute matches, events, performance data patterns, etc. All the specified filters are applied in sequential order. For example, the following query vm[=name rx exchangevm1][$t:Network adapter added] [@usedCapacity rx b u40+]

has one configuration attribute match filter, an event filter and one performance data pattern match filter specified.

After applying the filters, if a thread finds that a resource's performance metric data meets the criteria specified in the query in test 328, then test 330 is performed. If test 328 determines that the performance metric data of a resource does not meet the criteria in a query, step 331 is performed to discard the performance metric data. In step 330, the query is examined to determine if there is a sub path to a sub resource specified therein. If there is a sub path specified, the performance metric data of the sub path to sub resource is loaded from the NRDB. Then any specified filters are applied again in step 326 to determine if the sub resource qualifies, i.e., the performance metric data of the sub resource meets the specified criteria in the query. This process continues until all sub paths specified in the query to sub resources have been processed. When there are no more sub paths, or, if there were no sub paths specified in the first place, test 332 is performed to determine if the top level resource qualified, and, if not, the data is discarded in step 331. If the top level resource does qualify, the resource that qualified along with any performance data that met the criteria specified in the query are added to the Result Cache in step 334.

Those skilled in the art will appreciate alternative embodiments that do not depart from the spirit and scope of the above described embodiments. All such alternative embodiments are intended to be included within the scope of the claims appended hereto.

What is claimed is:

1. A data storage apparatus having a non relational database file system in memory of a server in which time-series performance metric data is stored by an access manager computer program running on said server, said access manager computer program structured to control said server for:
   A) receiving time-series data from a probe structured or programmed to monitor resources on a monitored computer by taking a sample of each attribute at various times on a time axis, and transmitting said various attribute values obtained as a result of said monitoring as said time-series data, and encoding said time-series numerical data as a form of time-series alphabetic codes which can be searched with a regular expression; and
   B) storing said encoded time-series data as a time-slice of alphabetic code text characters with the date said underlying time-series data was collected and an index of each of the resources to which said underlying attribute values in said time-series data pertain;
   said access manager computer program further comprising one or more routines which creates an index relating to said time axis when new time-series data is added, and wherein said data storage apparatus is further programmed to perform, before the storing of said alphabetic code text characters, a pattern matching search based on a pre-existing pattern on a time-window of said alphabetic code text characters, and creating a reference to a storage location of said alphabetic code text characters which matched said pre-existing pattern, and simultaneously storing said alphabetic code text characters and said reference.

2. The data storage apparatus of claim 1, wherein said data storage apparatus is further programmed to use said index relating to said time axis when new time-series data is added as a query data pattern when said new time-series data is added that is often used for a search.

3. The data storage apparatus of claim 1, wherein said data storage apparatus obtains, in the storing of said time-series alphabetic codes, statistical information with respect to a predefined set of values of the time-series alphabetic codes which corresponds to said time-series numerical data, and simultaneously stores said time-series alphabetic codes as text characters and said statistical information.

4. A data storage apparatus having a non relational database file system in memory of a server in which time-series performance metric data is stored by an access manager computer program running on said server, said access manager computer program structured to control said server to:
   A) receiving time-series data from a probe structured or programmed to monitor resources on a monitored computer by taking sample of each attribute at various times on a time axis, and transmitting said various attribute values obtained as a result of said monitoring as said time-series data, and encoding said time-series data as a form of time-series alphabetic codes which can be searched with a regular expression; and
   B) storing said encoded time-series data as a time-slice of alphabetic code text characters with a date said underlying time-series data was collected and an index of each of the resources to which said underlying attribute values in said time-series data pertain;
   and wherein said data storage apparatus is further programmed to compress, in the storing of said alphabetic code text characters which correspond to said time-series data, a previously-specified pattern of said alphabetic code text characters in a searchable manner;
   and wherein said data storage apparatus is further programmed to use as said query data pattern a pre-existing data pattern that is often used for a search.

5. A data storage apparatus having a non relational database file system in memory of a server in which time-series performance metric data is stored by an access manager computer program running on said server, said access manager computer program structured to control said server to:
   A) receive time-series data from a probe structured or programmed to monitor resources on a monitored computer and transmit various attribute values obtained as a result of said monitoring as said time-series data and encode said time-series data as Unicode time-series data; and B) store said Unicode time-series data as a time-slice of Unicode text characters with a date said Unicode time-series data was collected and a key based on the date and the identifier of each of the resources to which said attribute values in said time-series data pertain are collected, and storing said keys thereby achieving speed in access of data by either date or by the identity of the resource;

and wherein said access manager computer program creates an index relating to the time when new time-series data is added, and wherein said data storage apparatus is further programmed to perform, before the storing of said Unicode time-series data, a pattern matching search based on a pre-existing pattern on a time-window of said Unicode text characters, and the data at the beginning of the time window is extracted and stored, and, if matched by the aforementioned pattern search, a prediction being made that the data in the time-window is often referred to, and therefore there is created a reference to the storage location of said Unicode text characters which matched said pre-existing pattern, and this reference is simultaneously stored with said Unicode text characters.

6. A data storage apparatus having a non relational database file system in memory of a server in which time-series performance metric data is stored by an access manager computer program running on said server, said access manager computer program structured to control said server to:

A) receive time-series data from a probe structured or programmed to monitor resources on a monitored computer and transmit various attribute values obtained as a result of said monitoring as said time-series data and encode said time-series data as Unicode time-series data; and B) store said Unicode time-series data as a time-slice of Unicode text characters with a date said Unicode time-series data was collected and a key based on the date and the identifier of each of the resources to which said attribute values in said time-series data pertain, and storing said key thereby achieving speed in access of data by either date or by the identity of the resource and further comprising a circuit for creating an index relating to the time axis when new time-series data is added, and wherein said data storage apparatus is further programmed to perform, before the storing of said Unicode time-series data, a pattern matching search based on a pre-existing pattern on a time-window of said Unicode text characters and the data at head of the time window is extracted and stored, and, if matched by the aforementioned pattern search, a prediction is made that the data in the time-window is often referred to, and therefore there is created a reference to a storage location of said Unicode text characters which matched said pre-existing pattern, and this reference is simultaneously stored with said Unicode text characters, and wherein said data storage apparatus is further programmed to use as said query data pattern a pre-existing data pattern that is often used for a search.

7. A data storage apparatus having a non relational database file system in memory of a server in which time-series performance metric data is stored by an access manager computer program running on said server, said access manager computer program structured to control said server to:

A) receive time-series data from a probe structured or programmed to monitor resources on a monitored computer and transmit various attribute values obtained as a result of said monitoring as said time-series data and encode said time-series data as Unicode time-series data; and B) store said Unicode time-series data as a time-slice of Unicode text characters with a date said Unicode time-series data was collected and a key based on the date and the identifier of each of the resources to which said attribute values in said time-series data pertain, and storing said key thereby achieving speed in access of data by either date or by the identity of the resource, and further comprising a circuit which creates an index relating to the time axis when new time-series data is added, and wherein said data storage apparatus is further programmed to perform, before the storing of said Unicode time-series data, a pattern matching search based on a pre-existing pattern on a time-window of said Unicode text characters and the data at head of the time window is extracted and stored, and, if matched by the aforementioned pattern search, a prediction is made that the data in the time-window is often referred to, and therefore there is created a reference to a storage location of said Unicode text characters which matched said pre-existing pattern, and this reference is simultaneously stored with said Unicode text characters, and wherein said time-series data storage device obtains, in the storing of said Unicode text characters, statistical information with respect to a predefined set of values of the Unicode text characters which corresponds to said time-series data, and simultaneously stores said Unicode text characters and said statistical information.

* * * * *